(12) United States Patent
Gore et al.

(10) Patent No.: US 10,733,303 B1
(45) Date of Patent: Aug. 4, 2020

(54) POLYMORPHIC CODE TRANSLATION SYSTEMS AND METHODS

(71) Applicant: Polyverse Corporation, Kirkland, WA (US)

(72) Inventors: Archishmat Sharad Gore, Seattle, WA (US); Brittany Blue Gaston, Bellevue, WA (US); Devin Lim, Seattle, WA (US)

(73) Assignee: Polyverse Corporation, Kirkland, WA (US)

( * ) Notice: Subject to any disclaimer, the term of this patent is extended or adjusted under 35 U.S.C. 154(b) by 0 days.

(21) Appl. No.: 16/856,928

(22) Filed: Apr. 23, 2020

(51) Int. Cl.
  *G06F 21/57* (2013.01)
  *G06F 8/76* (2018.01)
  *G06F 8/51* (2018.01)

(52) U.S. Cl.
  CPC .............. *G06F 21/577* (2013.01); *G06F 8/51* (2013.01); *G06F 8/76* (2013.01); *G06F 2221/033* (2013.01)

(58) Field of Classification Search
  CPC ................................. G06F 21/577; G06F 8/51
  See application file for complete search history.

(56) References Cited

U.S. PATENT DOCUMENTS

| | | | | |
|---|---|---|---|---|
| 6,031,993 A | * | 2/2000 | Andrews | G06F 8/33 707/999.1 |
| 6,591,415 B1 | * | 7/2003 | Torrubia-Saez | G06F 21/10 717/158 |
| 8,014,308 B2 | | 9/2011 | Gates, III et al. | |
| 8,312,273 B2 | | 11/2012 | Nice et al. | |
| 8,595,743 B2 | | 11/2013 | Gounares et al. | |
| 8,650,538 B2 | | 2/2014 | Gounares | |
| 8,656,135 B2 | | 2/2014 | Gounares et al. | |
| 8,656,378 B2 | | 2/2014 | Gounares et al. | |
| 8,694,574 B2 | | 4/2014 | Gounares et al. | |
| 8,775,437 B2 | | 7/2014 | Weitz et al. | |
| 8,909,546 B2 | | 12/2014 | Horvitz et al. | |
| 8,966,462 B2 | | 2/2015 | Gounares et al. | |
| 8,978,016 B2 | | 3/2015 | Gataullin et al. | |
| 9,021,445 B2 | | 4/2015 | Gataullin et al. | |
| 9,112,900 B1 | * | 8/2015 | Peacock | G06F 40/151 |
| 9,286,042 B2 | | 3/2016 | Gounares et al. | |
| 9,292,415 B2 | | 3/2016 | Seto et al. | |
| 9,389,992 B2 | | 7/2016 | Gataullin et al. | |
| 9,417,859 B2 | | 8/2016 | Gounares et al. | |
| 9,465,721 B2 | | 10/2016 | Garrett et al. | |
| 9,483,590 B2 | | 11/2016 | Kishore et al. | |
| 9,558,362 B2 | | 1/2017 | Subires Bedoya | |

(Continued)

OTHER PUBLICATIONS

Gaston, B., "Applying Moving Target Defense cybersecurity tactics to programming languages," White Paper, Polyverse, Bellevue, Washington, Jan. 2020.

(Continued)

*Primary Examiner* — Ali Shayanfar
(74) *Attorney, Agent, or Firm* — ÆON Law PLLC; Adam L. K. Philipp; Jonathan E. Olson

(57) ABSTRACT

Security-enhanced computing systems and methods are described in regard to a migration of at-risk software that is valid in a first language is translated to a second language and situated in a safer environment. If expressions in said first language are encountered in said safer environment, errors or other special handling may result.

20 Claims, 10 Drawing Sheets

(56) References Cited

U.S. PATENT DOCUMENTS

| | | | |
|---|---|---|---|
| 9,665,474 B2 | 5/2017 | Li et al. | |
| 9,807,077 B2 | 10/2017 | Gounares | |
| 9,923,793 B1 | 3/2018 | Gore et al. | |
| 10,050,797 B2 | 8/2018 | Garrett et al. | |
| 10,127,160 B2 | 11/2018 | Gounares et al. | |
| 10,339,837 B1 | 7/2019 | Gounares et al. | |
| 2004/0221277 A1* | 11/2004 | Owen | G06F 9/45516 717/138 |
| 2005/0289125 A1* | 12/2005 | Liu | G06F 16/2448 |
| 2011/0239200 A1* | 9/2011 | Binsztok | G06F 8/311 717/140 |
| 2012/0069131 A1* | 3/2012 | Abelow | G06Q 10/067 348/14.01 |
| 2014/0274078 A1 | 9/2014 | Hyde et al. | |
| 2017/0220805 A1* | 8/2017 | Ng | G06F 11/3692 |
| 2018/0032314 A1* | 2/2018 | Gorbaty | G06F 21/577 |
| 2018/0270785 A1* | 9/2018 | Hall | H04W 4/14 |
| 2018/0365013 A1* | 12/2018 | Miyoshi | G06F 9/30061 |
| 2018/0367563 A1* | 12/2018 | Pfleger de Aguiar | G06F 21/577 |
| 2019/0265955 A1* | 8/2019 | Wolf | G06N 3/084 |
| 2019/0362077 A1* | 11/2019 | Schornack | G06F 8/51 |
| 2020/0112602 A1* | 4/2020 | Wuest | G06F 16/2457 |

OTHER PUBLICATIONS

Gaston, B., "Introducing Polyscripting—the beginning of the end of code injection," Polyverse Blog, Jul. 3, 2018©, <https://polyverse.com/blog/introducing-polyscripting-the-beginning-of-the-end-of-code-injection-fe0c99d6f199/>.

Gaston, B., "Polyscripting WordPress: using scrambled PHP to stop code injection attacks," Polyverse Blog, Sep. 11, 2018©, <https://polyverse.com/blog/polyscripting-wordpress-using-scrambled-php-to-stop-code-injection-attacks-b0ceb9fc3d91/>.

Sera, J., "Securing AWS Lambda by Standing on the Shoulders of Giants," Polyverse Blog, Jun. 21, 2019, <https://polyverse.com/blog/securing-aws-lambda-by-standing-on-the-shoulders-of-giants-c26a3ba05cc0/>.

* cited by examiner

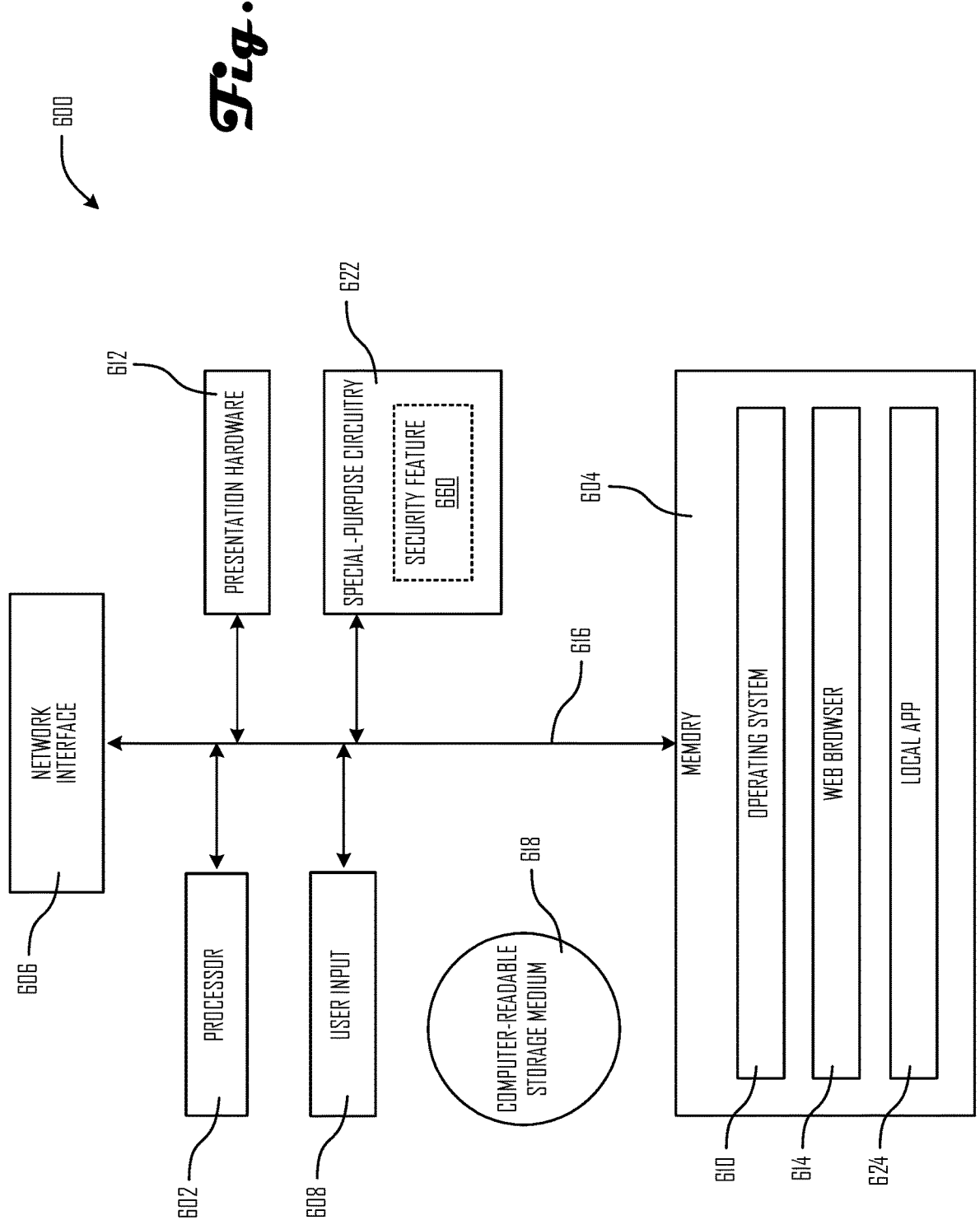

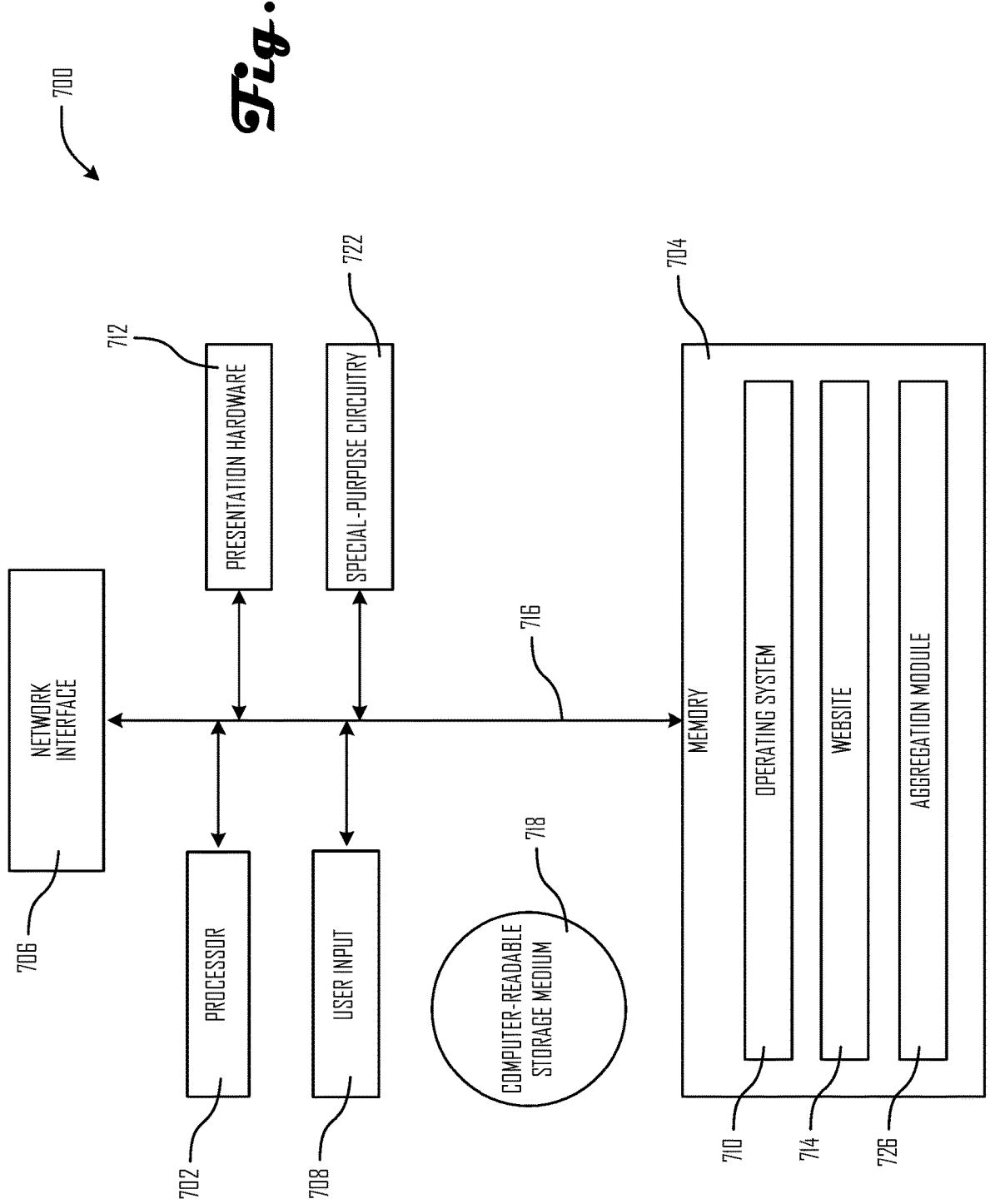

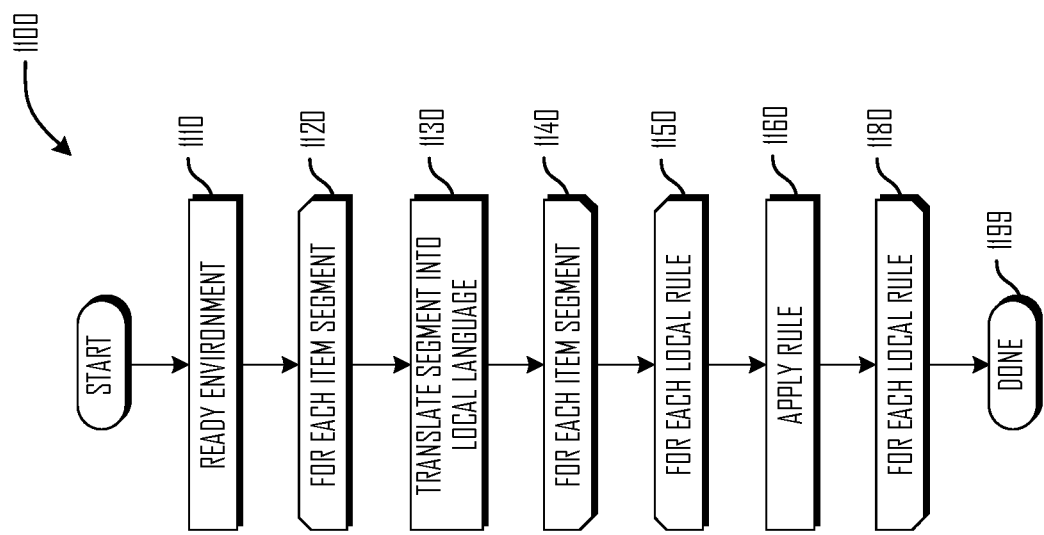
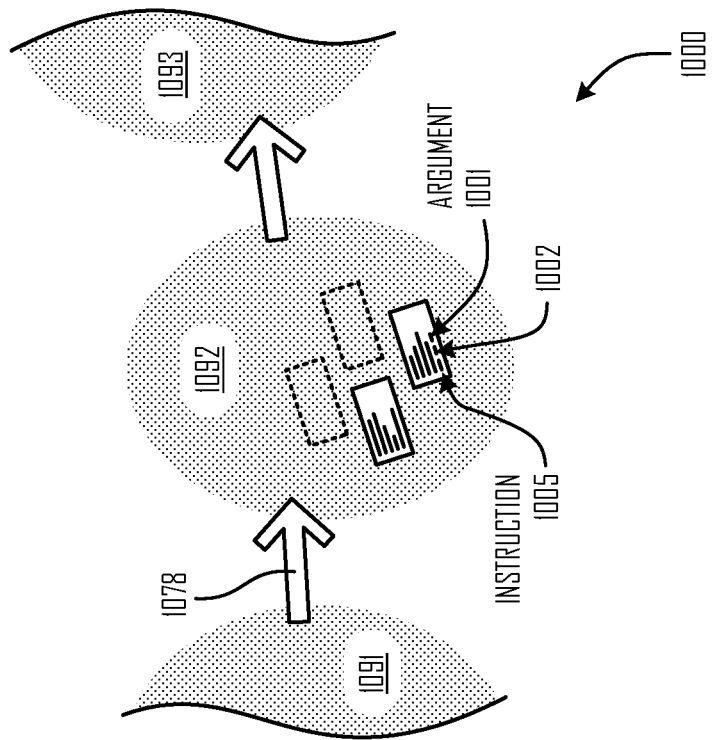

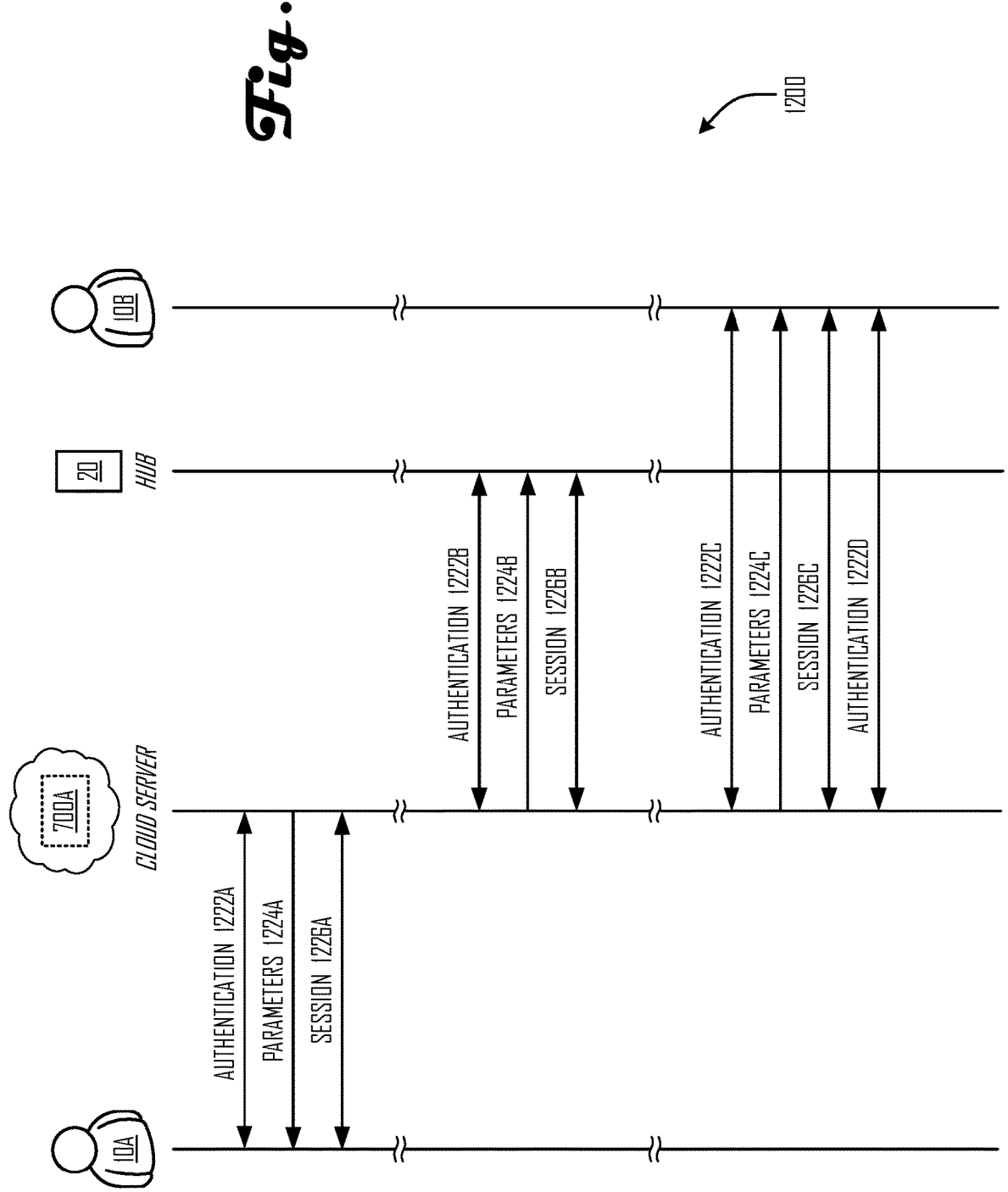

POLYMORPHIC CODE TRANSLATION SYSTEMS AND METHODS

RELATED APPLICATIONS

None.

BRIEF DESCRIPTION OF THE DRAWINGS

FIG. 6 schematically depicts a client device in which one or more improved technologies may be incorporated.

FIG. 7 schematically depicts a server in which one or more improved technologies may be incorporated.

FIG. 10 schematically depicts a "waypoint" environment that may exist in migratory contexts like those of FIGS. 1-5.

FIG. 11 depicts another flow diagram in which one or more improved technologies may be incorporated, one that may be used in flows like those of FIGS. 8-9.

FIG. 12 depicts an operational flow in which one or more improved technologies may be incorporated.

DETAILED DESCRIPTION

Figure 1:
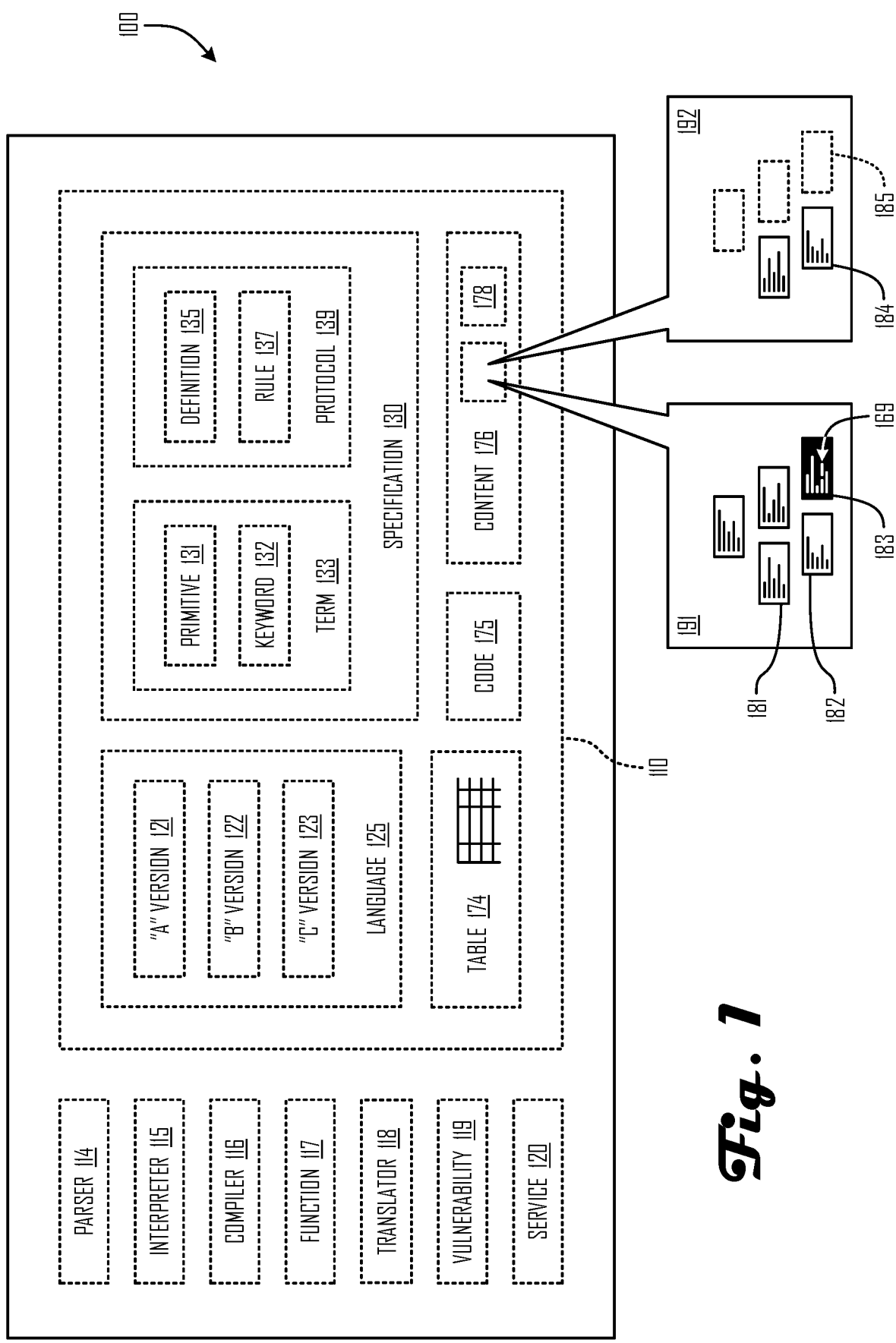
FIG. 1 depicts informational data borne by one or more data-handling media in which one or more improved technologies may be incorporated.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "absent," "after," "aggregated," "aliased," "along," "among," "any," "application-specific," "applied," "associated," "at least," "authorized," "automatic," "available," "based on," "because," "between," "compared," "complete," "component," "comprising," "conditional," "configured," "consecutive," "corresponding," "current," "determined," "digital," "directly," "distributed," "downloaded," "effective," "encrypted," "exceeding," "executable," "explicit," "first," "for," "generated," "greater," "identified," "illustrated," "immediate," "implemented," "implicit," "in lieu of," "included," "indicating," "integrated," "inversely," "invoked," "local," "malicious," "manifested," "mobile," "modified," "more," "near," "networked," "obtained," "of," "otherwise," "particular," "partly," "pertaining," "predicted," "prior," "private," "provided," "public," "received," "remote," "respective," "responsive," "safer," "scheduled," "scrambled," "second," "sequencing," "signaling," "single," "so as," "special-purpose," "specific," "subsequent," "suitable," "supplemental," "suspended," "synonymous," "taken," "thereafter," "third," "through," "toward," "transistor-based," "translated," "triggered," "trusted," "unable," "undefined," "undue," "updated," "upon," "upstream," "valid," "via," "watermarked," "wherein," "wireless," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Numerous" as used herein refers to more than one dozen. "Instantaneous" as used herein refers to having a duration of less than 0.1 seconds unless context dictates otherwise. "Immediate" as used herein refers to having a duration of less than 2 seconds unless context dictates otherwise. Circuitry or data items are "onboard" as used herein if they are aboard a vehicle or denoting or controlled from a facility or feature incorporated into the main circuit board of a computer or computerized device unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein a term like "PHP parser" or "second-language parser" is used to identify a parser that is configured to parse one or more versions of the identified language but unable to parse one or more other device-executable languages. As used herein "causing" is not limited to a proximate cause but also enabling, conjoining, or other actual causes of an event or phenomenon.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates one or more distributed or other data-handling media 100 comprising one or more instances of parsers 114, of interpreters 115, of compilers 116, of functions 117, of translators 118, of transpilers (e.g., combining a translator 118 with a compiler 116), of vulnerabilities 119, of services 120, or of other such software 110 or other data items in which one or more technologies may be implemented. In some contexts, for example, such items may include various versions 121-123 of legacy programming languages 125, each at least partly defined by a respective (instance of a) language specification 130. Most primitives 131, keywords 132, or other terms 133 of such languages correspond to one or more instances of definitions 135, of rules 137, or of other protocols 139 of parsing or translation, for example. Such relationships may be manifested in one or more dictionaries or other tables 174, in machine-readable or other programming code 175, or in other content 176 such as translations 178. In some variants, for example, code that exists in a first environment 191 may include several programming instruction series 181-183, some of which may feature a vulnerability 119 by which an exploitative script 169 may be injected or otherwise built, subjecting that environment 191 to malware. Worse, as naked source code (such as conventional JavaScript or PHP scripts) exhibits such vulnerabilities 119, present and future instruction sequences 184, 185 in other computing environments 192 may likewise become vulnerable as more and more hackers understand them.

Figure 2:
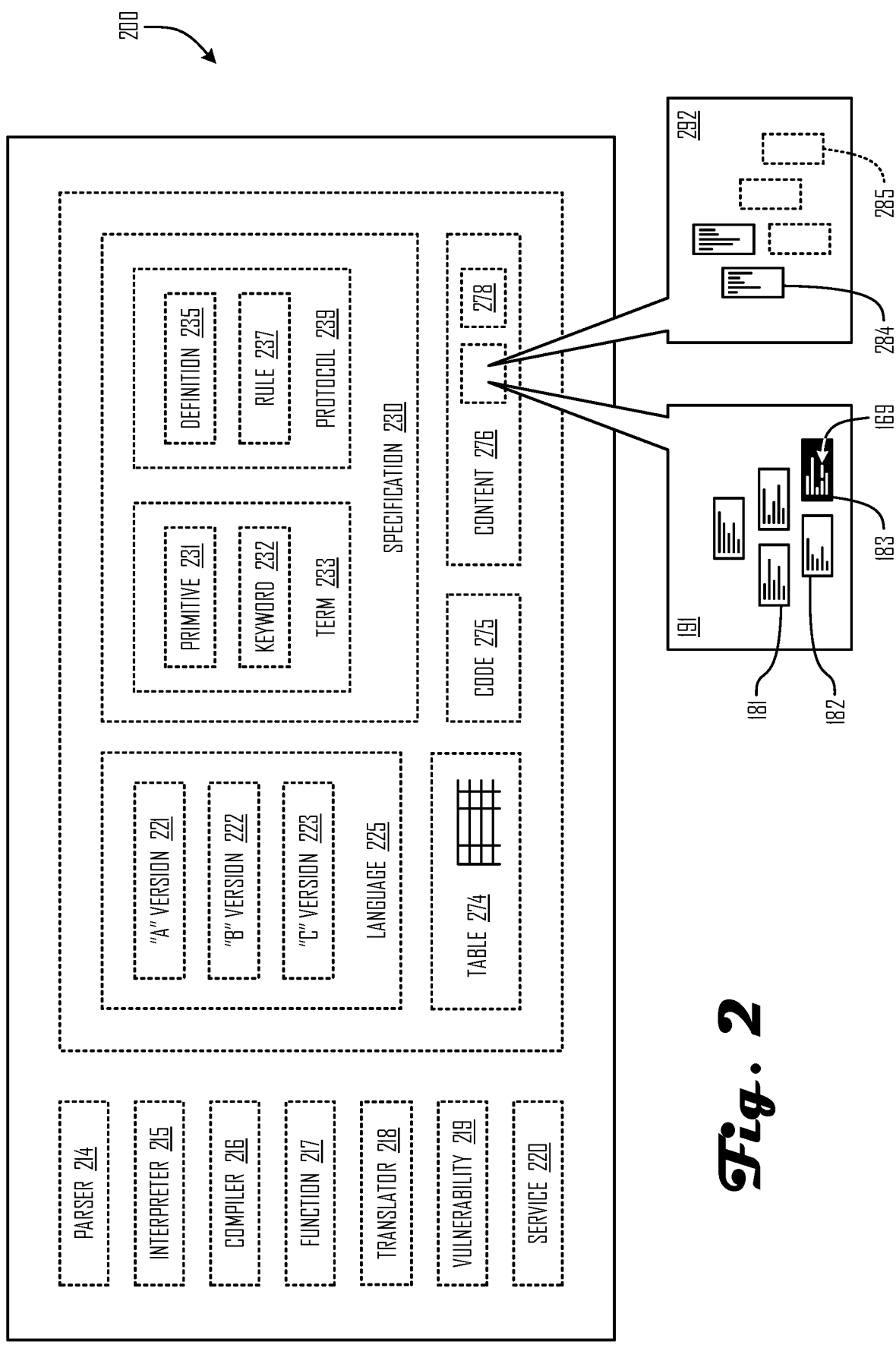
FIG. 2 depicts informational data borne by one or more data-handling media in which one or more improved technologies may be incorporated.

FIG. 2 schematically illustrates one or more memories or other data-handling media 200 comprising one or more instances of parsers 214, of interpreters 215, of compilers 216, of functions 217, of translators 218, of vulnerabilities 219, of services 220, or of other such data items 279 in which one or more technologies may be implemented more safely. In some contexts, for example, such items 279 may include various versions 221-223 of polyscripted or other systematically diversified programming languages 225 each at least partly defined by a respective (instance of a) language specification 230. Most or all primitives 231, keywords 232, or other terms 233 of each such language 225 described herein correspond to one or more instances of definitions 235, of rules 237, or of other protocols 239 of parsing, for example. Such relationships may be manifested in one or more dictionaries or other tables 274, in machine-readable or other programming code 275, or in other content 276 such as translations 278 by which one or more programming instruction series 281-282 may each migrate to a safer computing environment 292. As used herein terms like "safer" describe a software object relative to another object, signaling that the software object lacks one or more recognized attack-vector-vulnerabilities of the other object.

In some variants, for example, programming instruction series 284-285 may at least avoid a risk of first-language scripts 169 being injected into environment 292 by virtue of environment 292 lacking a first-language interpreter 115 or similar vulnerability 119. In some variants, for example, a suitable second language 225 may be generated by scrambling as described here:

TABLE 1

Algorithm 1 scrambler

```
 1:  # set of keywords:
 2:  import json
 3:  import random
 4:  import string
 5:  import sys
 6:  import re
 7:  import subprocess
 8:  import signal
 9:  import os
10:  from shutil import copyfile
11:  class PolyscriptConfig:
12:      @ staticmethod
13:      def random_string(kw_len):
14:          alphabet = string.ascii_lowercase
15:          return ''.join(random.choice(alphabet) for i in range(kw_len))
16:      def __init__(self, kw_len_max=7, kw_len_min=3):
17:          with open('polyscript-config.json') as json_file:
18:              config = json.load(json_file)
19:              self.scramble = config["scramble"]
20:              self.v8_path = config["v8_path"]
21:              self.backup_path = config["backup_path"]
22:              self.dictionary_out = config["dictionary_out"]
23:              self.dictionary = {i: self.random_string(random.randint(kw_len_min, kw_len_max))
24:                      for i in config["consume"]["keywords"]}
25:      self.changed_files = dict( )
26:  PSC = PolyscriptConfig( )
27:  def backup_file(file_in):
28:      basename ='/' + os.path.basename(file_in)
29:      path = PSC.backup_path
30:      if not os.path.isdir(path):
31:          os.makedirs(path)
32:      PSC.changed_files[file_in] = path + basename
33:      if not os.path.exists(path + basename):
34:          copyfile(file_in, path + basename)
35:  def file_process(input_path, permission, data=None):
36:      file_data = None
37:      try:
38:          with open(input_path, permission) as f:
39:              if permission == 'r':
40:                  backup_file(input_path)
41:                  file_data = f.read( )
42:              elif permission == 'w':
43:                  print(input_path)
44:                  file_data = f.write(data)
45:      except IOError as e:
46:          print("I/O error({0}): {1} {2}".format(e.errno, e.strerror, input_path))
47:          print("Attempting to restore original files.")
48:          catch_exit( )
49:      return file_data
50:  def handle_keywords_txt( ):
51:      for file in PSC.scramble["unquoted_kw"]:
52:          file_path = PSC.v8_path + file
53:          file_data = file_process(file_path, 'r', None)
54:          for keyword in PSC.dictionary.keys( ):
55:              file_data = file_data.replace(keyword + ",", PSC.dictionary[keyword] + ",")
56:          file_process(file_path, 'w', file_data)
57:  def handle_string_replace( ):
58:      def string_attach(w):
59:          return '"' + w + '"'
60:      sub_strings =list(map(string_attach, PSC.dictionary))
61:      regexp = re.compile('|'.join(map(re.escape, sub_strings)))
62:      for f in PSC.scramble["quoted_kw"]:
63:          file_data = file_process(PSC.v8_path + f, 'r')
64:          file_process(PSC.v8_path + f, 'w',
65:              regexp.sub(lambda match: string_attach(PSC.dictionary[match.group(0).strip('"')]), file_data))
66:          replace_for_bootstrapper( )
67:  def handle_scanner_inl( ):
68:      parse_start = "#define KEYWORDS(KEYWORD_GROUP, KEYWORD)\\"
69:      parse_end = "\n\n"
70:      file_data = file_process(PSC.v8_path + PSC.scramble["grouped_kw"], 'r')
71:      start_index = file_data.index(parse_start) + len(parse_start)
72:      end_index = file_data[start_index: ].index(parse_end) +
```

TABLE 1-continued

Algorithm 1 scrambler

```
start_index
73:         pre_parse = file_data[:start_index]
74:         post_parse = file_data[end_index:]
75:         token_groups = file_data[start_index: end_index].split("\n")
76:         file_out = pre_parse +
parse_scanner_tokens(token_groups) + post_parse
77:         file_process(PSC.v8_path + PSC.scramble["grouped_kw"],
'w', file_out)
78:     def parse_scanner_tokens(tokens):
79:         tok_str_keyword = re.compile('"'(.+?)'"')
80:         parse = dict( )
81:         tokens[len(tokens) − 1] = tokens[len(tokens) − 1] + '       \\'
82:         for i in tokens[1:]:
83:             m = tok_str_keyword.findall(i)
84:             if m:
85:                 word = m[0]
86:                 if word in PSC.dictionary:
87:                     i = i.replace(word, PSC.dictionary[word])
88:                     word = PSC.dictionary[word]
89:                 parse[word] = i
90:         return group_keywords(parse)
91:     def group_keywords(parsed):
92:         keys = list(parsed.keys( ))
93:         keys.sort( )
94:         group = "a"
95:         out = "KEYWORD_GROUP('a')                         \\"
96:         for i in keys:
97:             if not i[0] <= group:
98:                 group = i[0]
99:                 out += "\n" + " KEYWORD_GROUP('" + i[0] + "')     \\"
100:            out += "\n" + parsed[i]
101:        return "\n" + out [:-1]
102:    def scramble_sources( ):
103:        handle_keywords_txt( )
104:        handle_scanner_inl( )
105:        handle_string_replace( )
106:    def replace_for_bootstrapper( ):
107:        if 'for' in PSC.dictionary:
108:            out = file_process(PSC.v8_path + "srdinit/
bootstrapper.cc", 'r')
109:            file_process(PSC.v8_path + "src/init/bootstrapper.cc", 'w',
out.replace(PSC.dictionary["for"], "for"))
110:    def catch_exit( ):
111:        for original_path in PSC.changed_files:
112:            copyfile(PSC.changed_files[original_path], original_path)
113:        print("Original Files restored.")
114:        sys.exit(1)
115:    def handler(signum, frame):
116:        print("SIGINT: Restoring original files.")
117:        catch_exit( )
118:    def restore_originals( ):
119:        if os.path.exists(PSC.backup_path):
120:            print("Backup directory found, replacing previously
polyscripted files with originals.")
121:            for dirName, _, fileList in os.walk(PSC.backup_path):
122:                for f in fileList:
123:                    file = dirName + '/' + f
124:                    print(file)
125:                    copyfile(file, file.replace(PSC.backup_path,
PSC.v8_path))
126:    def backup_dynamic( ):
127:        for f in PSC.scramble["dynamic"]:
128:            backup_file(PSC.v8_path + f)
129:        gen = file_process(PSC.v8_path +
"tools/gen-keywords-gen-h.py", 'r')
130:        file_process(PSC.v8_path + "tools/gen-keywords-gen-h.py",
'w', ''.join(gen.rsplit('128', 1)))
131:    def main( ):
132:        restore_originals( )
133:        if check_empty( ):
134:            return
135:        backup_dynamic( )
136:        scramble_sources( )
137:        file_process(PSC.dictionary_out, 'w', json.dumps(PSC.
dictionary, indent=4))
138:        babel_transform( )
139:        final_d8( )
140:        call_subprocess( )
141:        check_fallthrough( )
142:        print("Done. Scrambling Complete.")
143:    def babel_transform( ):
144:        print(PSC.scramble["printer"] + "generators")
145:        (_, _, filenames) = os.walk((PSC.scramble["printer"] +
"generators")).next( )
146:        for _file in filenames:
147:            cur_file = PSC.scramble["printer"] + "generators/" +_file
148:            data_in = file_process(cur_file, 'r')
149:            data_out = ''
150:            for _line in data_in.splitlines( ):
151:                if "this.word" in _line and "node.name" not in _line and
"'"not in _line:
152:                    _line = _line.replace("word(", "reserved(")
153:                data_out = data_out + os.linesep + _line
154:            file_process(cur_file, 'w', data_out)
155:        printer = file_process(PSC.scramble["printer"] +
"printer.js", 'r')
156:        index = printer.index("word(str) {"")
157:        out = printer.index] + """reserved(str) {
158:        var dictionary = {""" + print_dictionary( ) + """}
159:        this.word(str in dictionary ? dictionary[str] : str);
160:        }
161:        """ + printer[index:]
162:        file_process(PSC.scramble["printer"] + "printer.js", 'w', out)
163:    def print_dictionary( ):
164:        items = PSC.dictionary.items( )
165:        items_out = ''.join(map(lambda x: x[0] + ': "' + x[1] + '"', ',
items))
166:        return items_out [:-1]
167:    def call_subprocess( ):
168:        try:
169:            subprocess.check_call(['node', 'polyscriptify.js', '-p',
'../test/cctest/'])
170:        except subprocess.CalledProcessError as e:
171:            print("Call Process Error({0}): {1}at {2} - during
polyscripting cctest".format(e.returncode, e.output, e.cmd))
172:            print("Attempting to restore original files.")
173:            catch_exit( )
174:        os.chdir(PSC.v8_path)
175:        try:
176:            subprocess.check_call(['python', './tools/gen-keywords-
gen-h.py'])
177:        except subprocess.CalledProcessError as e:
178:            print("Call Process Error({0}): {1}at {2} - error calling
keyword generator.".format(e.returncode, e.output, e.cmd))
179:            print("ERROR when calling ./tools/gen-keywords-
gen-h.py. Failing.")
180:            catch_exit( )
181:        check_fallthrough( )
182:    def check_fallthrough( ):
183:        gen_file = "./src/parsing/keywords-gen.h"
184:        file_process(gen_file, 'w', file_process(gen_file,
'r').replace("/*FALLTHROUGH*/", "U_FALLTHROUGH;", 1))
185:    def final_d8( ):
186:        x = file_process(PSC.v8_path + "src/d8/d8-js.cc", 'r')
187:        starting = x.index("D8(") + len("D8(")
188:        ending = x.index(")D8")
189:        file_process(PSC.v8_path + "src/d8/d8-js.cc", 'w',
x[:starting] + get_poly_snip(x[starting: ending]) + x[ending:])
190:    def check_empty( ):
191:        if PSC.dictionary:
192:            return False
193:        else:
194:            file_process(PSC.dictionary_out, 'w',
json.dumps(PSC.dictionary, indent=4))
195:            return True
196:    def get_poly_snip(snip):
197:        process = subprocess.Popen(['node', 'polyscriptify.js',
'-s', snip], stdout=subprocess.PIPE)
198:        return process.communicate( )[0]
199:    if __name__ == '__main__':
200:        signal.signal(signal.SIGINT, handler)
201:        sys.exit(main( ))
```

Figure 3:
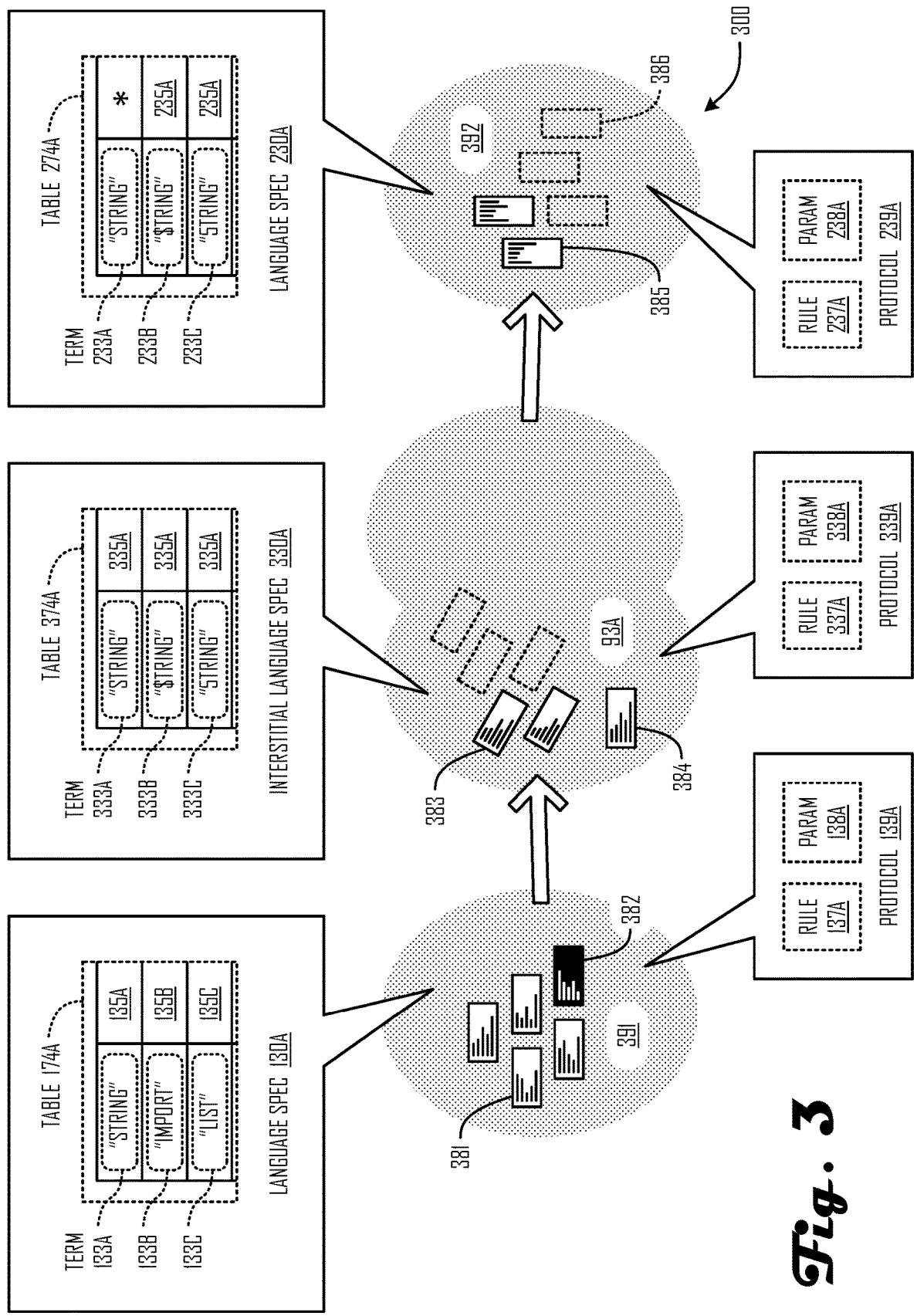
FIG. 3 schematically depicts salient aspects of a system implementing a translational code migration in which one or more technologies may be implemented.

FIG. 3 schematically illustrates salient aspects of a system 300 by which at-risk software 110 that is valid in a first programming language 125 operable in a first environment 391 can migrate to a translated second programming language 225 operable in a second environment 392 via one or more interstitial languages operable in one or more interstitial computing or other environments 93A. This can occur, for example, in a context in which the first programming language 125 includes well-known heritage-language terms 133A-C implicitly or otherwise defined in a parser 114, interpreter 115, compiler 116, or other such service 120 operable (e.g., upon one or more instruction series 381, 382) in the first environment 391. For example a language specification 130A of (an instance of) the first language 125 may define a term 133A of "String" with a corresponding definition 135A, a term 133B of "Import" with a corresponding definition 135B, and a term 133C of "List" with a corresponding definition 135C (e.g., in a table 174A thereof). The use of such services 120 may impose one or more instances of rules 137A, of parameters 138A, or of other (aspects of) protocols 139A as further described below.

Likewise, an interstitial language scrambled or otherwise derived from the first programming language 125 may include various corresponding terms 333A-C at least partly defined in a service 120 operable upon instruction series 383 in an interstitial environment 93A as shown. For example an interstitial language specification 330A as shown may define a heritage-language term 333A of "String" with a corresponding definition 335A, a derived term 333B of "$tring" with an effectively identical definition, and another derived term 333C of "String" with the same definition (e.g., in a table 374A thereof). The use of such services 120 may impose one or more instances of rules 137A, of parameters 138A, or of other (aspects of) protocols 139A as further described below.

In some contexts, one or more instances of rules 337A, of parameters 338A, or of other interstitial-environment protocols 339A may manifest two or more such synonymous terms 333A-C so as to implement interstitial watermarking as described below. Alternatively or additionally such manifestations may implement term aliasing that maintains human-readability in the derived interstitial language or in first-language instruction series 384 selectively accessible in the interstitial environment 93A (e.g., so as to permit inductive function calls to compiled heritage code 175 being triggered by one or more aliased terms 333B-C) as further described below.

Likewise, a language 225 scrambled or otherwise derived from the first programming language 125 may include various corresponding terms 233B-C at least partly defined in a service 220 operable upon instruction series 385, 386 in an environment 392 as shown (e.g., in a table 274A thereof). For example language specification 230A as shown may maintain a derived term 233B of "$tring" with an effectively identical definition 235A as that of another derived term 233C of "String" so that either will behave (nominally) in the same way when invoked in the environment 392. Alternatively or additionally a heritage-language term 233A like "String" may be rendered inoperable in such downstream environments in some variants of rules 237A, of parameters 238A, or of other downstream-environment protocols 239A. In some variants, for example, such protocols 239A may comprise containerized monitoring, real-time notifications or lockdowns, or other exceptional security event handling.

Figure 4:
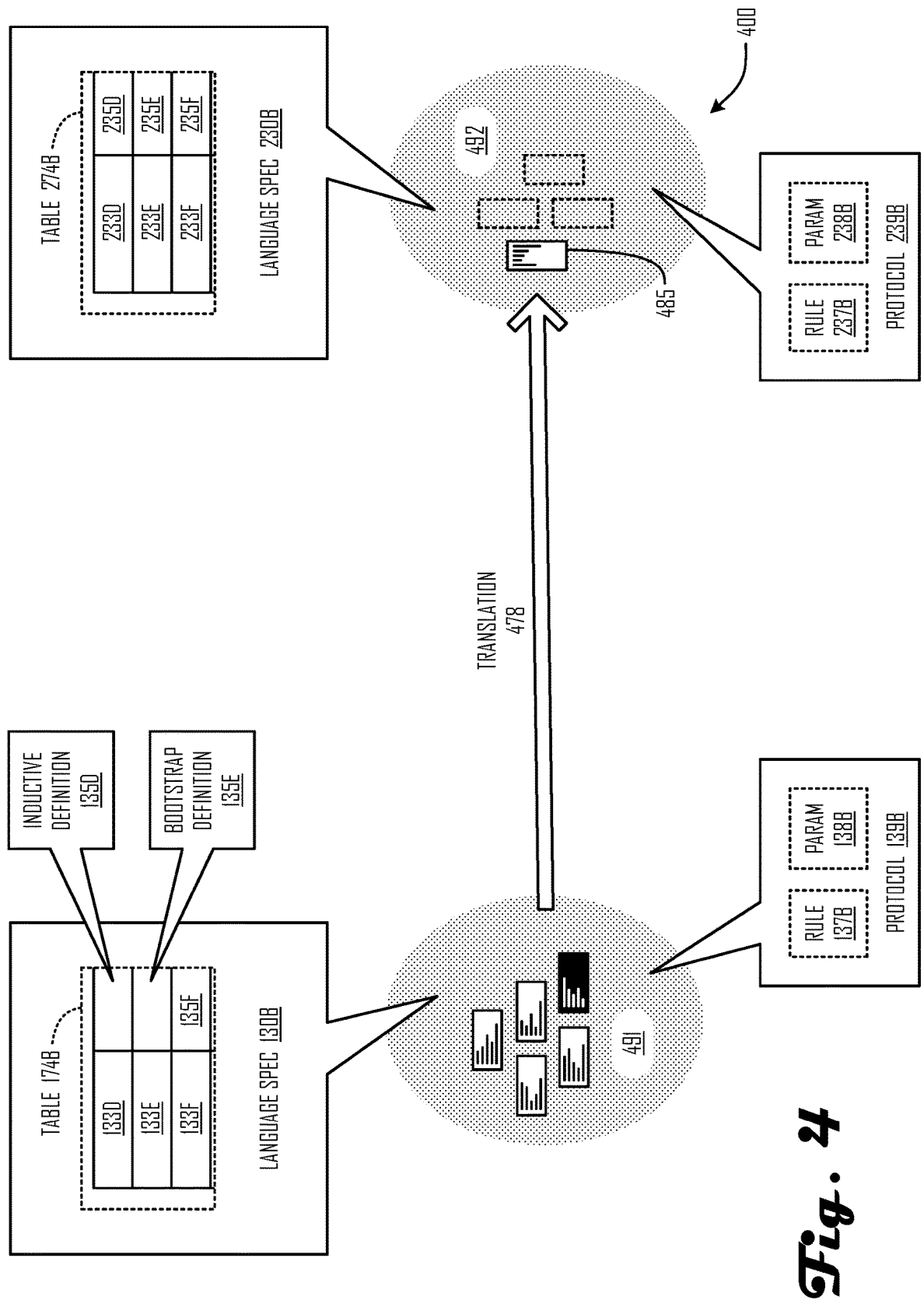
FIG. 4 schematically depicts salient aspects of a system implementing another translational code migration in which one or more technologies may be implemented.

FIG. 4 schematically illustrates salient aspects of a system 400 by which at-risk software 110 that is valid in a first programming language 125 operable in a first environment 491 can migrate to a translated second programming language 225 operable in a second environment 492 via a compound translation 478 with or without any interstitial environments 93A. This can occur, for example, in a context in which the first programming language 125 includes heritage-language terms 133D-F implemented in a parser 114, interpreter 115, compiler 116, or other such service 120 operable in (an instance of) the first environment 491. For example a language specification 130B of (an instance of) the first language 125 may define a term 133D with a corresponding inductive definition 135D, a term 133E with a corresponding bootstrap definition 135E, and a term 133F with an explicit closed definition 135F (e.g., in a table 174B thereof). The use of such services 120 may impose one or more instances of rules 137B, of parameters 138B, or of other (aspects of) protocols 139B as described herein.

Likewise, a language 225 derived from the first programming language 125 may include human-readable or other corresponding terms 233D-F at least partly defined in a service 220 operable upon instruction series 485 in an environment 492 as shown (e.g., in a table 274B thereof). For example, language specification 230B as shown may include several working definitions 235D-F each corresponding to a respective term even though some such terms were derived from self-referential, bootstrap, or other "open" upstream expressions. In some contexts, in which environment 492 is an instance of environment 392, moreover, one or more rules 237B, parameters 238B, or other downstream-environment protocols 239B may invoke special handling when evidence of injected code 275 or other suspicious phenomena are encountered.

Figure 5:
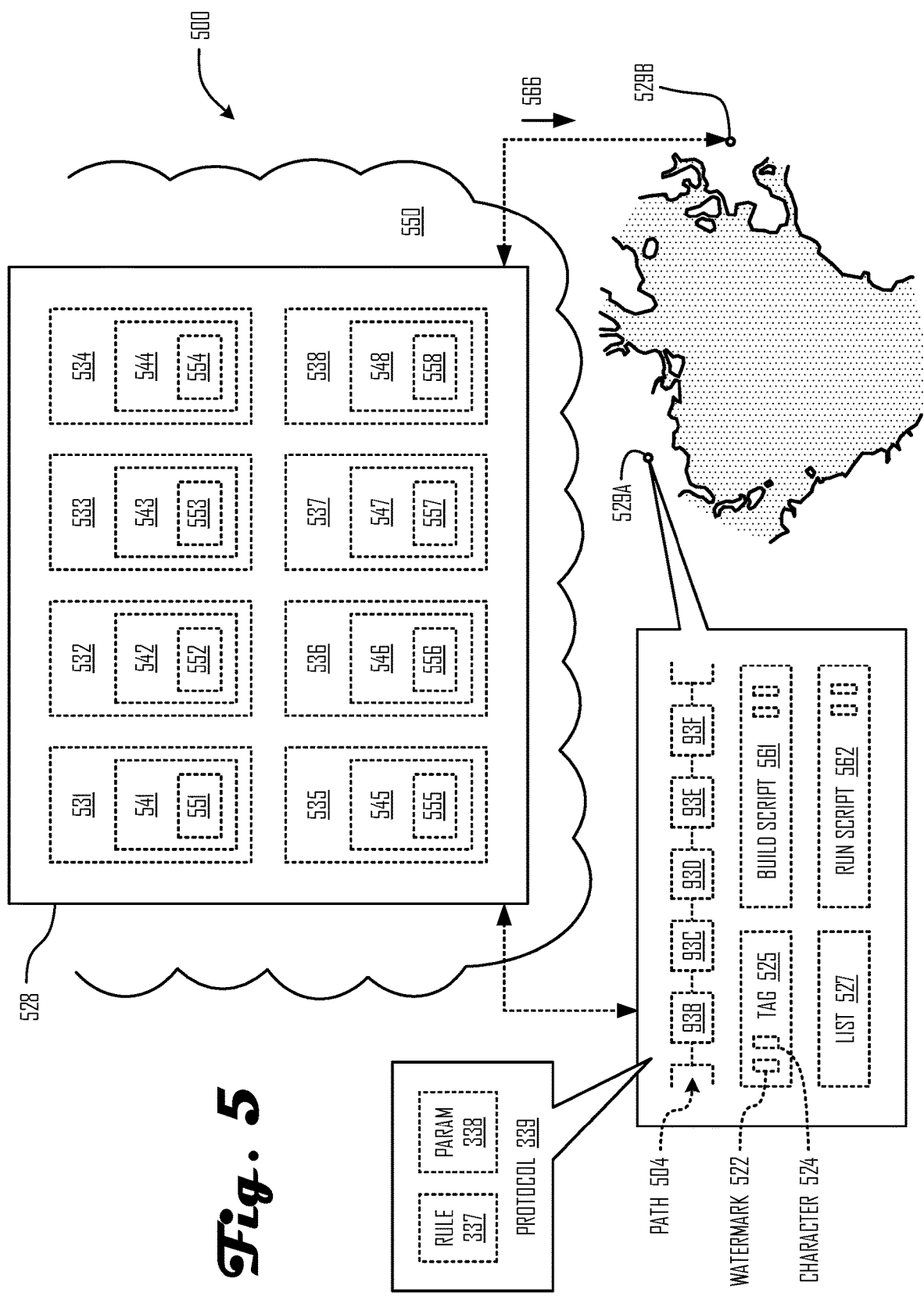
FIG. 5 schematically depicts salient aspects of a system implementing another translational code migration in which one or more technologies may be implemented to facilitate trans-oceanic interactions.

FIG. 5 schematically illustrates one or more distributed or other data-handling media 500 configured to facilitate transoceanic monitoring and comprising transistor-based circuitry 528 in one or more data networks 550, in which one or more technologies may be implemented. In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session parameters 566 or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 528 may comprise one or more integrated circuits (ICs), for example, optionally mounted on one or more circuit boards. Whether implemented in a distributed cloud or within one or more apparatuses 529A-B described herein, transistor-based circuitry 528 comprises an event-sequencing structure generally as described in U.S. Pat. Pub. No. 2015/0094046 but configured as described herein. Transistor-based circuitry 528 may (optionally) include one or more instances of evaluation modules 531 configured for local processing, for example, each including an electrical node set 541 upon which informational data is represented digitally as a corresponding voltage configuration 551. Transistor-based circuitry 528 may likewise include one or more instances of parsing modules 532-533 configured for local processing, for example, each including an electrical node set 542-543 upon which informational data is represented digitally as a corresponding voltage configuration 552-553. Transistor-based circuitry 528 may (optionally) likewise include one or more instances of invocation modules 534 configured for triggering remote processing (using cloud-based instances of circuitry described herein, for example), each including an electrical node set 544 upon which informational data is represented digitally as a corresponding voltage configuration 554. Transistor-based circuitry 528 may likewise include one or more instances of recognition modules 535-537 configured for local processing, for example, each including an electrical node set 545-547 upon which informational data is represented digitally as a corresponding voltage configuration 555-557. Transistor-based circuitry 528 may likewise include one or more instances of interface modules 538 configured for implementing, for example, each including an electrical node set 548 upon which informational data is represented digitally as a corresponding voltage configuration 558.

In some variants, for example, a server or other apparatus 529A in North America may manifest an instance of a migration path 504 between an original computing environment 191, 391, 491 and a computing environment 292, 392, 492. Some such paths may pass through multiple computing or other interstitial environments 93B-F of which some may provide one or more rules 337, parameters 338, or other aspects of respective protocols 339 thereof to implement one or more watermarks 522 or other security tags 525 thereof, such as with a judicious use of non-printing characters. Alternatively, or additionally, cloud implementation circuitry 528 or a local apparatus 529A (or a combination thereof) may maintain a list 527 of tasks, needs, or resources as further described below. Alternatively, or additionally, one or more such interstitial environments 93B-F may (optionally) each need a respective build script 561 or run script 562 or both as further described below, so that several clients seeking access to upstream content may each be monitored in a respectively distinct interstitial environment. A data flow diagram featuring a remote apparatus 529B (e.g. a client, hub, or hacker in Europe) is provided at FIG. 12.

As used herein a "version" of a digital object refers to a variant having partial structural identicality with the object or partial functional identicality with the object (or both). For example, two "versions" of semicolons may exist in respective programming languages 125, 225 if at least one rule 137, 237, 337 applicable to one does not apply to the other. As used herein a first version 121-123 of an instruction series or other software object is "less safe" than a second version 221-223 of the object if one or more vulnerabilities 119 present in the first version are not present in the second version. In some contexts, it is advantageous to migrate a population of instruction series to a less-safe language version or environment 93C-D (e.g., to facilitate access by an authenticated entity for analysis or augmentation) and then to a safer version or environment 93E.

Referring now to FIG. 6, there is shown a client device 600 in which one or more technologies may be implemented. Client device 600 may include one or more instances of processors 602, of memories 604, user inputs 608, and of (speakers or other) presentation hardware 612 all interconnected along with the network interface 606 via a bus 616. One or more network interfaces 606 allow device 600 to connect via the Internet or other networks 150). Memory 604 generally comprises a random-access memory ("RAM"), a read only memory ("ROM"), and a permanent mass storage device, such as a disk drive.

Memory 604 may contain one or more instances of operating systems 610, of web browsers 614, of other local apps 624, or of other modules that facilitate operations described herein. These and other software components may be loaded from a non-transitory computer readable storage medium 618 into memory 604 of the client device 600 using a drive mechanism (not shown) associated with a non-transitory computer readable storage medium 618, such as a floppy disc, tape, DVD/CD-ROM drive, flash card, memory card, or the like. In some embodiments, software or other digital components may be loaded via the network interface 606, rather than via a computer readable storage medium 618. Special-purpose circuitry 622 (implementing a security feature 660, e.g.) may, in some variants, include some or all of the event-sequencing logic described herein. In some embodiments client device 600 may include many more components than those shown in FIG. 6, but it is not necessary that all conventional components of a mobile device be shown in order to disclose an illustrative embodiment.

Referring now to FIG. 7, there is shown a server 700 in which one or more technologies may be implemented. Server 700 may include one or more instances of processors 702, of memories 704, user inputs 708, and of (speakers or other) presentation hardware 712 all interconnected along with the network interface 706 via a bus 716. One or more network interfaces 706 allow server 700 to connect via the Internet or other networks 150). Memory 704 generally comprises a random access memory ("RAM"), a read only memory ("ROM"), and a permanent mass storage device, such as a disk drive.

Memory 704 may contain one or more instances of operating systems 710, of websites 714, of aggregation modules 726, or of media preference affinity services or other such scoring modules that facilitate modeling the preferences of a user/member. These and other software components may be loaded from a non-transitory computer readable storage medium 718 into memory 704 of the server 700 using a drive mechanism (not shown) associated with a non-transitory computer readable storage medium 718, such as a floppy disc, tape, DVD/CD-ROM drive, flash card, memory card, or the like. In some embodiments, software or other digital components may be loaded via the network interface 706, rather than via a computer readable storage medium 718. Special-purpose circuitry 722 may, in some variants, include some or all of the event-sequencing logic described herein. In some embodiments server 700 may include many more components than those shown in FIG. 7, but it is not necessary that all conventional components of a server be shown in order to disclose an illustrative embodiment.

Figure 8:
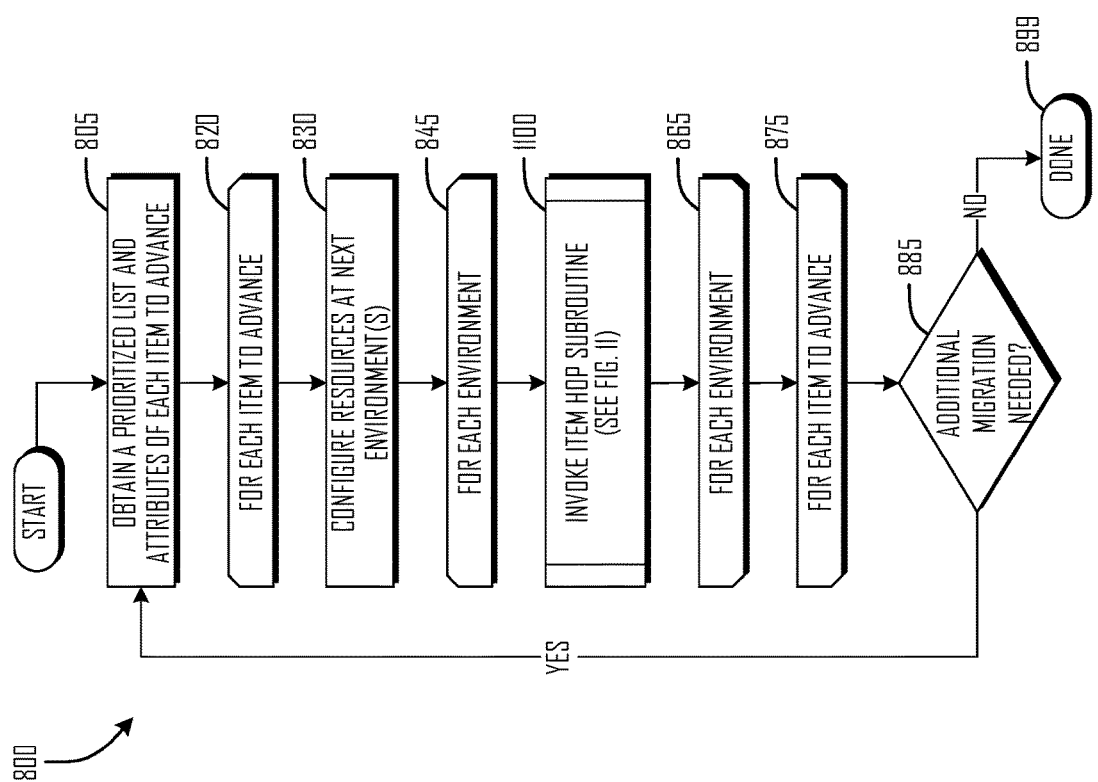
FIG. 8 depicts a flow diagram in which one or more improved technologies may be incorporated.

FIG. 8 illustrates an operational flow 800 suitable for use with at least one embodiment, such as may be performed on a client device 600 or server 700 using special-purpose circuitry thereof. As will be recognized by those having ordinary skill in the art, not all events of information management are illustrated in FIG. 8. Rather, for clarity, only those steps reasonably relevant to describing the security-enhanced computing interaction aspects of flow 800 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 805 describes obtaining a prioritized list and attributes for each instruction series or similar item to advance.

Operation 820 begins an iterative protocol performed upon each instruction series or other item that may be needed in one or more downstream environments.

Operation 830 performs a configuration of any authorizations or similar resources that may be needed along an intended path for the item.

Operation 845 begins an iterative protocol performed upon each successive movement of the current item to a next downstream environment.

Operation 1100 signals invoking a flow by which the item may be advanced to the next downstream environment. See FIG. 11.

Operation 865 signals a repetition or conclusion of the iterative protocol performed to advance the current item downstream.

Operation 875 signals a repetition or conclusion of the iterative protocol performed upon each item moved.

Operation 885 signals a determination whether a current list still signals one or more migrations are needed. If so, control passes back to operation 805.

Otherwise operation 899 signals a completion of the operational flow 800, such as by returning a result signaling a successful migration.

Figure 9:
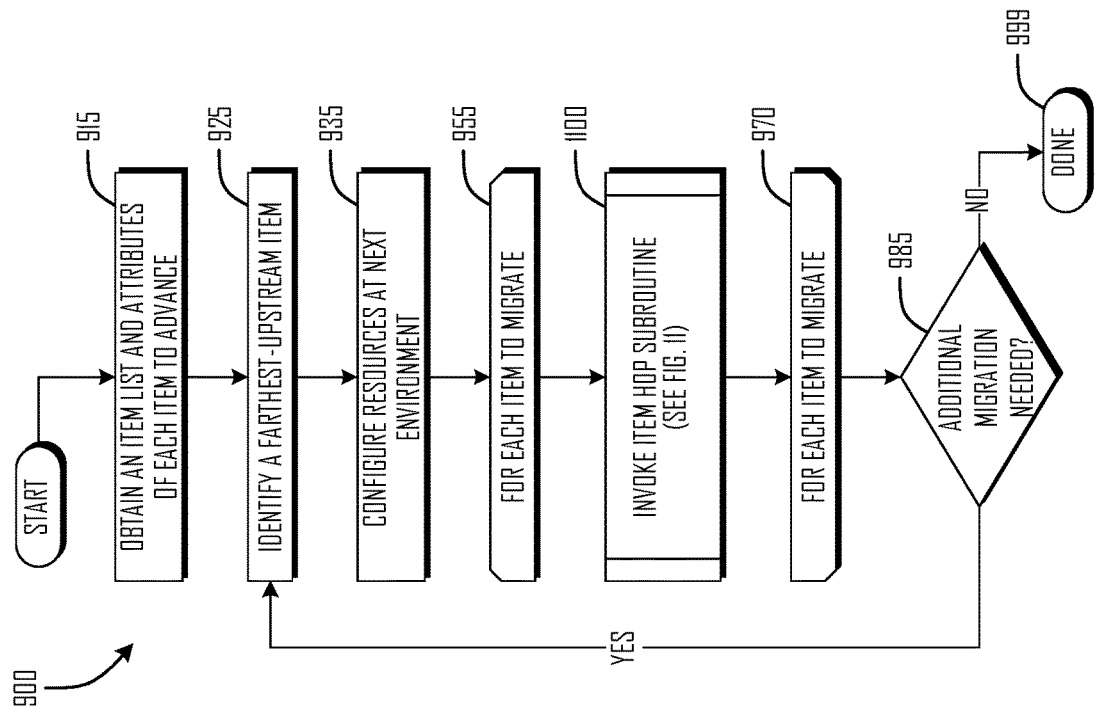
FIG. 9 depicts another flow diagram in which one or more improved technologies may be incorporated.

FIG. 9 illustrates an operational flow 900 suitable for use with at least one embodiment, such as may be performed on a client device 600 or server 700 using special-purpose circuitry thereof. As will be recognized by those having ordinary skill in the art, not all events of information management are illustrated in FIG. 9. Rather, for clarity, only those steps reasonably relevant to describing the security-enhanced computing interaction aspects of flow 900 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 915 describes obtaining an item list and attributes for each instruction series or similar item to advance.

Operation 925 describes identifying a farthest-upstream item.

Operation 935 describes configuring one or more resources at a next environment for which the furthest-upstream item is bound.

Operation 955 begins an iterative protocol by which other items alongside the furthest-upstream item are designated in turn.

Operation 1100 signals invoking a flow by which the item may be advanced to the next downstream environment. See FIG. 11.

Operation 970 signals a repetition or conclusion of the iterative protocol performed upon each item moved.

Operation 985 signals a determination whether a current list still signals one or more migrations are needed. If so, control passes back to operation 925.

Otherwise operation 999 signals a completion of the operational flow 900, such as by returning a result signaling a successful migration.

Referring now to FIG. 10, there is shown a waypoint 1000 comprising an interstitial environment 1092 positioned between one or more upstream environments 1091 and one or more downstream environment 1093. The one or more upstream environments feature an established or other legacy language specification 130 in which at least one (kind of) legacy instruction 1005 defines a first argument 1001 and a second argument 1002 in that order. As a part of one or more upstream translations 1078, however, a transposition is implemented so that in the instruction 1005 at environment 1092, a corresponding first argument 1001 must be presented after a corresponding second argument 1002. Such a translation 1078 might effectively convert an IF-THEN instruction in a legacy language into a TH # N-/F instruction, for example, confounding malware that could otherwise glean or modify the meaning of an instruction series that included one or more such modified-grammar instructions 1005.

FIG. 11 illustrates an operational flow 1100 suitable for use with at least one embodiment, such as may be performed on a client device 600 or server 700 using special-purpose circuitry thereof. As will be recognized by those having ordinary skill in the art, not all events of information management are illustrated in FIG. 11. Rather, for clarity, only those steps reasonably relevant to describing the security-enhanced computing interaction aspects of flow 1100 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1110 describes readying an environment, such as by retrieving, accessing, or otherwise obtaining a translator 218 or local language specification 230 (e.g., pertaining to an instantiation of one or more environments 292, 392, 1092 described herein) or allocating computing resources for its use. See FIG. 12.

Operation 1120 begins an iterative protocol performed upon each instruction or other item segment (e.g., during an instruction series translation).

Operation 1130 performs a translation upon that segment from an upstream language into a current local language. As used herein a "local" feature may pertain to an interstitial or environment, irrespective of physical geography.

Operation 1140 signals a repetition or conclusion of the iterative protocol performed upon each item segment.

Operation 1150 begins an iterative protocol pertaining to each local rule (e.g., for multiple validation or security rules 237, 337 imposed by the local environment 292, 392, 1092).

Operation 1160 applies the rule of the current iteration.

Operation 1180 signals a repetition or conclusion of the iterative protocol performed upon each local rule.

Operation 1199 signals a completion of the operational flow 1100, such as by returning a result to a flow 800, 900 that called flow 1100.

FIG. 12 depicts a particular scenario and progressive data flow 1200 in which client devices 600 of respective human clients 10A-B interact with one or more servers 700 to facilitate creation or restoration of protected computing environments described herein. After an authentication 1222A in which client 10A and cloud server 700A each provide a keyword or other identifying information, one or more parameters 1224A are downloaded to initiate a session 1226A during which one or more client devices 600 of that client 10A have access to a unique environment derived from and accessible only with a combination of such identifying information from both sides.

Likewise, after an authentication 1222B in which a non-human hub 20 and cloud server 700A each provide a keyword or other identifying information, one or more parameters 1224B are downloaded to initiate a session 1226B during which the hub has access to a unique environment derived from and accessible only with a combination of such identifying information from both the hub 20 and the server 700A. Likewise after an authentication 1222C in which one or more other human clients 10B and cloud server 700A each provide a keyword or other identifying information, one or more parameters 1224C are downloaded to initiate a session 1226C during which one or more respective client devices 600 of those clients 10B have access to a unique environment derived from and accessible only with a combination of such identifying information from both/all sides.

In this way, cloud server 700A may facilitate respective secure environments such that sharing resources among clients occurs only in one-off environments 1092 of which other entities are expected to have no access. As such a time-limited additional authentication 1222D may be imposed by the server 700A on an unscheduled basis or in response to alien watermarks 522, unexpected hidden characters 524, behavioral deviations from that of a prior code version 221-223, or other such unforeseen phenomena being detected (e.g., by one or more risk-indicative-pattern recognition modules 537) in such one-off environments 1092. Such measures can be even for instruction series originally created in an open programming language 130 not conventionally susceptible of migratory translations 178, 1078 as described herein.

In some variants, for example, several terms 233, 333 in an interstitial or language specification 230, 330 are each configured to have several terms 233, 333 to have several characters in common with a corresponding legacy-language term 133 so that the local language specification 230, 330 is not a legacy language expression but is human-readable as well as device-executable. Even arcane local language specifications can be satisfied by providing custom code 275 in the local environment that allows an instruction series to be modified and thereby temporarily violate the local language specification 330A during modifications by an authenticated human client 10B. Once the hapless-but-privileged human client 10B finishes an attempted code modification, the custom code 275 can decide whether to restore one or more suitable watermarks 522 in the locally modified instruction series. This can occur in a context, for example, in which effective human participation in an upgrade would otherwise require falling back to outdated or otherwise untrustworthy heritage-language scripts 181-183.

Referring again to the figures above, there are shown several flows 800, 900, 1100 configured to coordinate or otherwise cause a migration of at-risk software 110 that is valid in a first programming language 125 (e.g., according to a language specification 130 of the first programming language 125). One or more control modules 532 are invoked so as to cause one or more translators 118, 218 remotely or otherwise to trigger a translation 178 of a first device-executable instruction series 181 that is valid in the first programming language 125 into a translated instruction series 285, 385 that is valid in a second programming language 225 but not in the first programming language 125. This can occur, for example, in a context in which a voltage configuration 552 on an electrical node set 542 thereof manifests an eval result signaling such validity.

One or more recognition modules 537 that operates upon instruction series in the protected computing environment 290 is configured to cause a second-language parser 214 to recognize whether translated content 276 is valid in the second programming language 225 by applying a language specification 230 of the second programming language 225 in lieu of the language specification 130 of the first programming language 125. This can occur, for example, in a context in which a voltage configuration 557 on an electrical node set 547 thereof manifests an eval result signaling such validity.

One or more implementation modules 536 is configured to configure or otherwise provide a protected computing environment 290 in which at least one interpreter 215, compiler 216, or other execution service 220 thereof is configured to use the second-language parser 214 to execute the translated instruction series 285, 385. This can occur, for example, in a context in which a voltage configuration 556 on an electrical node set 546 thereof manifests authorization for such processing. In some variants this allows the translated instruction series that is valid in the second programming language 225 but not in the first programming language 125 to be executed in the protected computing environment 290 by applying a language specification 230 of the second programming language 225 in lieu of the language specification 130 of the first programming language 125.

In light of teachings herein, numerous existing techniques may be applied for configuring special-purpose circuitry or other structures effective for securing, aggregating, connecting, analyzing, modeling, translating, recognizing, prioritizing, executing, and other operations as described herein without undue experimentation. See, e.g., U.S. patent Ser. No. 10/339,837 ("Distribution of scrambled binary output using a randomized compiler"); U.S. patent Ser. No. 10/127,160 ("Methods and systems for binary scrambling"); U.S. patent Ser. No. 10/050,797 ("Inserting snapshot code into an application"); U.S. Pat. No. 9,923,793 ("Client-side measurement of user experience quality"); U.S. Pat. No. 9,807,077 ("Systems and methods for containerized data security"); U.S. Pat. No. 9,665,474 ("Relationships derived from trace data"); U.S. Pat. No. 9,558,362 ("Data encryption using an external arguments encryption algorithm"); U.S. Pat. No. 9,483,590 ("User-defined application models"); U.S. Pat. No. 9,465,721 ("Snapshotting executing code with a modifiable snapshot definition"); U.S. Pat. No. 9,417,859 ("Purity analysis using white list/black list analysis"); U.S. Pat. No. 9,389,992 ("Multiple tracer configurations applied on a function-by-function level"); U.S. Pat. No. 9,292,415 ("Module specific tracing in a shared module environment"); U.S. Pat. No. 9,286,042 ("Control flow graph application configuration"); U.S. Pat. No. 9,021,445 ("Tracer list for automatically controlling tracer behavior"); U.S. Pat. No. 8,978,016 ("Error list and bug report analysis for configuring an application tracer"); U.S. Pat. No. 8,966,462 ("Memory management parameters derived from system modeling"); U.S. Pat. No. 8,909,546 ("Privacy-centric ad models that leverage social graphs"); U.S. Pat. No. 8,849,968 ("Secure and stable hosting of third-party extensions to web services"); U.S. Pat. No. 8,775,437 ("Dynamic reranking of search results based upon source authority"); U.S. Pat. No. 8,694,574 ("Optimized settings in a configuration database with boundaries"); U.S. Pat. No. 8,656,378 ("Memorization configuration file consumed at compile time"); U.S. Pat. No. 8,656,135 ("Optimized memory configuration deployed prior to execution"); U.S. Pat. No. 8,650,538 ("Meta garbage collection for functional code"); U.S. Pat. No. 8,595,743 ("Network aware process scheduling"); U.S. Pat. No. 8,312,273 ("Privacy vault for maintaining the privacy of user profiles"); U.S. Pat. No. 8,014,308 ("Hardware architecture for cloud services"); and U.S. Pat. Pub. No. 20140274078 ("Protocols for facilitating broader access in wireless communications").

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A security-enhanced computing method (e.g., performed via one or more flows of FIG. 8, 9, or 11) configured to facilitate or otherwise cause a migration of at-risk software 110 that is valid in a first language 125 (e.g., according to a language specification 130 of the first language 125), comprising:

invoking transistor-based circuitry (e.g., one or more control modules 532) configured to authorize or otherwise cause one or more cloud-resident or other translators 118, 218 to translate a first device-executable instruction series 181 that is valid (e.g., as an eval result 178) in the first language 125 into a translated instruction series 285, 385 that is valid in a second language 225 but not in the first language 125;

invoking transistor-based circuitry (e.g., one or more recognition modules 537 optionally as a component of an execution module 538 that operates in the protected computing environment 290) configured to cause a second-language parser 214 to recognize whether translated content 276 is valid in the second language 225 by applying a language specification 230 of the second language 225 in lieu of the language specification 130 of the first language 125; and invoking transistor-based circuitry (e.g., one or more implementation modules 536) configured to host or otherwise provide a protected computing environment 290 in which at least one interpreter 215, compiler 216, or other execution service 220 is configured to use the second-language parser 214 to execute the translated instruction series 285, 385.

2. The computing method of Clause 1 whereby a safer version 221-223 of the at-risk software 110 includes the translated instruction series, comprising:

allowing the translated instruction series that is valid in the second language 225 but not in the first language 125 to be executed in the protected computing environment 290 by applying a language specification 230 of the second language 225 in lieu of the language specification 130 of the first language 125.

3. (Independent) A security-enhanced computing method (optionally performed on a system 300, 400, 500 described above and) configured to trigger or otherwise cause a migration of at-risk software 110 that is valid in a first language 125, comprising:

invoking transistor-based circuitry (e.g., one or more control modules 532) configured to cause one or more translators 118, 218 remotely or otherwise to translate a first device-executable instruction series 181 that is valid (e.g., as an eval result 178) in the first language 125 into a translated instruction series 285, 385 that is valid in a second language 225 but not in the first language 125;

invoking transistor-based circuitry (e.g., one or more control modules 533) configured to cause the one or more translators 118, 218 also to translate one or more additional device-executable instruction series 182, 183 that are valid in the first language 125 but not in the second language 225 each into a corresponding translated instruction series 285, 385 that is valid in the second language 225 but not in the first language 125;

invoking transistor-based circuitry (e.g., one or more recognition modules 537) configured to cause a second-language parser 214 to recognize whether translated content 276 is valid in the second language 225 by applying a language specification 230 of the second language 225 in lieu of the language specification 130 of the first language 125; and invoking transistor-based circuitry (e.g., one or more implementation modules 536) configured to (manifest or otherwise) provide a protected computing environment 290 in which at least one interpreter 215, compiler 216, or other execution service 220 is configured to use the second-language parser 214 to execute the translated instruction series 285, 385 and at least one of the corresponding translated instruction series 284 that are valid in the second language 225.

4. The computing method of Clause 3 whereby the protected computing environment 290 can access most or all services 120 of the one or more additional device-executable instruction series 284 without a vulnerability 219 to the services 220 being affected by keywords 132 or other code 175 in the first language 125 being present in the protected computing environment 290, and whereby a safer version 221-223 of the at-risk software 110 includes the corresponding translated instruction series 284.

5. The computing method of Clause 3 whereby the protected computing environment 290 can access most or all services 120 of the one or more additional device-executable instruction series 284 without a vulnerability 219 to the services 220 being affected by keywords 132 or other code 175 in the first language 125 being present in the protected computing environment 290 and whereby a safer version 221-223 of the at-risk software 110 includes the corresponding translated instruction series 284, comprising:

allowing the translated instruction series 285 that is valid in the second language 225 but not in the first language 125 to be executed in the protected computing environment 290 by applying a language specification 230 of the second language 225 in lieu of the language specification 130 of the first language 125; and allowing at least some of the safer version of the at-risk software that includes the corresponding translated instruction series 284 to execute in the protected computing environment 290 by applying a language specification 230 of the second language 225 in lieu of the language specification 130 of the first language 125.

6. The computing method of any of the above Clauses wherein the one or more translators 118, 218 are configured to implement at least one translation 178, 278, 478 of a first instruction series 181, 381 from the first language 125 indirectly to a second instruction series 185, 385 in a second language 225 via an interstitial third language defined by an interstitial language specification 330A, wherein the interstitial language specification 330A defines at least one term 333A that is absent from or otherwise undefined in a language specification 230A-B of the second language 225, wherein the interstitial language specification 330A defines at least one term 333A that is undefined in the language specification 230A-B of the second language 225 and has at least one synonymous term 333B-C in the interstitial language specification, and wherein the defined term of the interstitial language specification corresponds (e.g., as illustrated in FIG. 4) to a legacy term 133D that is recursively defined (e.g., having an inductive definition 135D) in the first language 125.

7. The computing method of any of the above Clauses wherein the one or more translators 118, 218 are configured to implement at least one translation 178, 278, 478 of a first instruction series 181, 381 from the first language 125 indirectly to a second instruction series 185, 385 in a second language 225 via an interstitial third language defined by an interstitial language specification 330A, wherein the interstitial language specification 330A defines at least one term 333A that is undefined in a language specification 230A-B of the second language 225, wherein the interstitial language specification 330A defines at least one term 333A that is undefined in the language specification 230A-B of the second language 225 and has at least one synonymous term 333 in the interstitial language specification, and wherein the at least one term 333A of the interstitial language specification corresponds (e.g., as illustrated in FIG. 4) to a legacy term 133E that has a bootstrap definition 135E in a language specification 130A-B of the first language 125.

8. The computing method of any of the above Clauses wherein the one or more translators 118, 218 are configured to implement at least one translation 178, 278, 478 of a first instruction series 181, 381 from the first language 125 indirectly to a second instruction series 185, 385 in a second language 225 via an interstitial third language defined by an interstitial language specification 330A and wherein the interstitial language specification 330A defines at least one term 333A that is absent from the language specification 230A-B of the second language 225 and has at least one synonymous term 333 in the interstitial language specification.

9. The computing method of any of the above Clauses wherein the one or more translators 118, 218 are configured to implement at least one translation 178, 278, 478 of a first instruction series 181, 381 from the first language 125 indirectly to a second instruction series 185, 385 in a second language 225 via an interstitial third language defined by an interstitial language specification 330A, wherein the interstitial language specification 330A defines at least one term 333A that is undefined in a language specification 230A-B of the second language 225, and wherein the interstitial language specification 330A defines at least one term 333A that is absent from the language specification 230A-B of the second language 225.

10. The computing method of any of the above Clauses, comprising:

configuring the language specification 230 of the second language 225 to replace more than half of the terms 133 in the language specification 130 of the first language 125 before a translation 278 of the first device-executable instruction series 181 that is valid in the first language 125 into the translated instruction series 285, 385 that is valid in the second language 225, wherein the translation 278 modifies one or more grammar rules 137 of the first language 125 by transposing two arguments 1001, 1002 thereof.

11. The computing method of any of the above Clauses, comprising:

configuring one or more grammar rules 237 of the language specification 230 of the second language 225 to adapt one or more grammar rules 137 of the first language 125 by transposing two arguments 1001, 1002 within an instruction 1005 thereof so that a first argument 1001 that is expected earlier than the second argument 1002 in the first language 125 is altered in one or more grammar rules 237 of the second language 225 so that a corresponding first argument 1001 is expected later than a corresponding second argument 1002 in one or more corresponding grammar rules 237 of the second language 125.

12. The computing method of any of the above Clauses, comprising:

configuring the language specification 230 of the second language 225 to replace more than half of the terms 133 in the language specification 130 of the first language 125 before a translation 278 of the first device-executable instruction series 181 that is valid in the first language 125 into the translated instruction series 285, 385 that is valid in the second language 225.

13. The computing method of any of the above Clauses, comprising:

establishing an authenticated human client 10A with limited access to the protected computing environment 290;

configuring several terms 233B-C in the language specification 230 of the second language 225 each to have several characters in common with a corresponding legacy-language term 133 so that the second language 225 is human-readable as well as device-executable;

allowing a human-readable instruction series 383 to violate the language specification 230 of the second language 225 by permitting the authenticated human client 10A to view and edit the human-readable instruction series 386; and thereafter restoring a compliance with the language specification 230 of the second language 225 by implementing an editing function 117 that inserts or modifies one or more characters 524 thereof so as to reintroduce one or more suitable watermarks 522 back into the human-readable instruction series 383.

14. The computing method of any of the above Clauses, wherein the interstitial language specification 330A includes one or more rules 237A that require one or more watermarks 522 to be implemented in a compliant instruction series 383 (e.g., by interspersing one or more spaces selectively with other non-printing characters 524).

15. The computing method of any of the above Clauses, wherein the interstitial language specification 330A requires one or more watermarks 522 to be implemented in a compliant instruction series 383, comprising:

configuring several terms 333 in the interstitial language specification 330A each to have several characters in common with a corresponding legacy-language term 133 so that the interstitial third language is human-readable as well as device-executable;

causing a human-readable instruction series 383 to violate the interstitial language specification 330A by allowing an authenticated human client 10A to view and edit the human-readable instruction series 383 in the interstitial third language; and thereafter restoring a compliance with the interstitial language specification 330A by implementing an editing function 117 that reintroduces one or more watermarks 522 back into the human-readable instruction series 383.

16. (Independent) A security-enhanced computing system 300, 400, 500 configured to facilitate or otherwise cause a migration of at-risk software 110 that is valid in a first language 125 (e.g., according to a language specification 130 of the first language 125), comprising:

transistor-based circuitry (e.g., one or more control modules 532) configured to authorize or otherwise cause one or more cloud-resident or other translators 118, 218 to translate a first device-executable instruction series 181 that is valid (e.g., as an eval result) in the first language 125 into a translated instruction series 285, 385 that is valid in a second language 225 but not in the first language 125;

transistor-based circuitry (e.g., one or more recognition modules 537 optionally as a component of an interpreter 215 that operates in the protected computing environment 290) configured to cause a second-language parser 214 to recognize whether translated content 276 is valid in the second language 225 by applying a language specification 230 of the second language 225 in lieu of the language specification 130 of the first language 125; and transistor-based circuitry (e.g., one or more implementation modules 536) configured to assemble or otherwise provide a protected computing environment 290 in which at least one interpreter 215, compiler 216, or other execution service 220 is configured to use the second-language parser 214 to execute the translated instruction series 285, 385.

17. The computing system of Clause 16 configured as an instance of system 300.

18. The computing system of either of the above system Clauses and configured as an instance of system 400.

19. The computing system of any of the above system Clauses and configured as an instance of system 500.

20. The computing system of any one of Clauses 16 to 19, wherein the transistor-based circuitry thereof all resides on a single integrated circuit chip.

21. The computing system of any one of Clauses 16 to 19, wherein the transistor-based circuitry thereof all resides in a single apparatus 529.

22. The computing system of any one of Clauses 16 to 19, wherein the transistor-based circuitry thereof all resides in one or more cloud-resident servers 700.

23. The computing system of any of the above system Clauses and configured to perform a method selected from the above method Clauses.

With respect to the numbered claims expressed below, those skilled in the art will appreciate that recited operations therein may generally be performed in any order. Also, although various operational flows are presented in sequence (s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A security-enhanced computing method configured to cause a migration of at-risk software that is valid according to a language specification of an open first programming language, comprising:

invoking transistor-based circuitry configured to cause one or more translators to translate a first device-executable instruction series that is valid in said open first programming language indirectly into a translated second device-executable instruction series that is valid in a second programming language but not in said open first programming language, via at least one interstitial third language defined by an interstitial language specification, wherein said interstitial language specification defines at least one term that is undefined in a language specification of said second programming language;

invoking transistor-based circuitry configured to cause said one or more translators also to translate numerous additional device-executable instruction series that are valid in said open first programming language but not in said second programming language each into a corresponding translated second device-executable instruction series that is valid in said second programming language but not in said open first programming language;

invoking transistor-based circuitry configured to recognize whether content is valid in said second programming language by applying a language specification of said second programming language in lieu of said language specification of said open first programming language as a second-language parser; and invoking transistor-based circuitry configured to establish a protected computing environment configured to use said second-language parser to process both said translated second device-executable instruction series and at least one of said corresponding translated second device-executable instruction series, wherein said interstitial language specification defines at least one term that is absent from said language specification of said second programming language and has at least one synonymous term in said interstitial language specification, whereby said protected computing environment can access at least some service of said numerous additional device-executable instruction series without any vulnerability to code in said open first programming language being processed in said protected computing environment, and whereby said corresponding translated second device-executable instruction series comprises an other version of said at-risk software, and (A) wherein said invoking said transistor-based circuitry configured to establish said protected computing environment configured to use said second-language parser to process both said translated second device-executable instruction series and said at least one of said corresponding translated second device-executable instruction series comprises establishing said protected computing environment as an environment in which a first compiler is configured to process said translated second device-executable instruction series and said at least one corresponding translated second device-executable instruction series that are valid in said second language, wherein said first compiler includes said second-language parser, whereby said protected computing environment can access at least some service of said one or more additional device-executable instruction series without any vulnerability to code in said first language being processed in said protected computing environment, and whereby said corresponding translated second device-executable instruction series comprises said other version of said at-risk software or (B) wherein said security-enhanced computing method further comprises:

allowing said translated second device-executable instruction series that is valid in said second programming language but not in said first programming language to be executed in said protected computing environment by applying said language specification of said second programming language in lieu of said language specification of said first programming language; and allowing at least some of said other version of said at-risk software that includes said corresponding translated second device-executable instruction series to execute in said protected computing environment by applying said language specification of said second programming language in lieu of said language specification of said first programming language.

2. The security-enhanced computing method of claim 1 comprising:

said allowing said translated second device-executable instruction series that is valid in said second programming language but not in said first programming language to be executed in said protected computing environment by applying said language specification of said second programming language in lieu of said language specification of said first programming language; and said allowing at least some of said other version of said at-risk software that includes said corresponding translated second device-executable instruction series to execute in said protected computing environment by applying said language specification of said second programming language in lieu of said language specification of said first programming language and wherein said invoking said transistor-based circuitry configured to establish said protected computing environment configured to use said second-language parser to process both said translated second device-executable instruction series and said at least one of said corresponding translated second device-executable instruction series comprises:

establishing said protected computing environment as an environment in which a first interpreter is configured to execute said translated second device-executable instruction series that is valid in said second language, wherein said first interpreter includes said second-language parser.

3. The security-enhanced computing method of claim 1 wherein said invoking said transistor-based circuitry configured to establish said protected computing environment configured to use said second-language parser to process both said translated second device-executable instruction series and said at least one of said corresponding translated second device-executable instruction series comprises:

establishing said protected computing environment as an environment in which said first compiler is configured to process said translated second device-executable instruction series and said at least one corresponding translated second device-executable instruction series that are valid in said second language, wherein said first compiler includes said second-language parser, whereby said protected computing environment can access at least some service of said one or more additional device-executable instruction series without any vulnerability to code in said first language being processed in said protected computing environment, and whereby said corresponding translated second device-executable instruction series comprises said other version of said at-risk software.

4. The security-enhanced computing method of claim 1 wherein said security-enhanced computing method comprises:

said allowing said translated second device-executable instruction series that is valid in said second programming language but not in said first programming language to be executed in said protected computing environment by applying said language specification of said second programming language in lieu of said language specification of said first programming language; and said allowing at least some of said other version of said at-risk software that includes said corresponding translated second device-executable instruction series to execute in said protected computing environment by applying said language specification of said second programming language in lieu of said language specification of said first programming language.

5. The security-enhanced computing method of claim 1 wherein said security-enhanced computing method further comprises:

said allowing said translated second device-executable instruction series that is valid in said second programming language but not in said first programming language to be executed in said protected computing environment by applying said language specification of said second programming language in lieu of said language specification of said first programming language; and said allowing at least some of said other version of said at-risk software that includes said corresponding translated second device-executable instruction series to execute in said protected computing environment by applying said language specification of said second programming language in lieu of said language specification of said first programming language and wherein said invoking said transistor-based circuitry configured to establish said protected computing environment configured to use said second-language parser to process both said translated second device-executable instruction series and said at least one of said corresponding translated second device-executable instruction series comprises:

establishing said protected computing environment as an environment in which a first just-in-time (JIT) compiler is configured to process said translated second device-executable instruction series that is valid in said second language, wherein said first JIT compiler includes said second-language parser.

6. The security-enhanced computing method of claim 1 wherein said security-enhanced computing method further comprises:

said allowing said translated second device-executable instruction series that is valid in said second programming language but not in said first programming language to be executed in said protected computing environment by applying said language specification of said second programming language in lieu of said language specification of said first programming language; and said allowing at least some of said other version of said at-risk software that includes said corresponding translated second device-executable instruction series to execute in said protected computing environment by applying said language specification of said second programming language in lieu of said language specification of said first programming language and wherein said invoking said transistor-based circuitry configured to establish said protected computing environment configured to use said second-language parser to process both said translated second device-executable instruction series and said at least one of said corresponding translated second device-executable instruction series comprises:

establishing said protected computing environment as an environment in which a first transpiler is configured to process said translated second device-executable instruction series that is valid in said second language, wherein said first transpiler includes said second-language parser.

7. The security-enhanced computing method of claim 1, comprising:

configuring several terms in said interstitial language specification each to have several characters in common with a corresponding legacy-language term so that said interstitial third language is human-readable as well as device-executable;

causing a human-readable device-executable instruction series to violate said interstitial language specification by allowing an authenticated human client to view and edit said human-readable device-executable instruction series in said interstitial third language; and thereafter restoring a compliance with said interstitial language specification by implementing an editing function that inserts one or more suitable watermarks back into said human-readable device-executable instruction series.

8. The security-enhanced computing method of claim 1, wherein said interstitial language specification allows one or more watermarks to be implemented in one or more non-printing characters of a compliant interstitial device-executable instruction series.

9. The security-enhanced computing method of claim 1 wherein said interstitial language specification defines at least one term that has at least one synonymous term in said interstitial language specification and wherein said defined term of said interstitial language specification corresponds to a term that is recursively defined in said first language.

10. The security-enhanced computing method of claim 1 wherein said interstitial language specification defines at least one term that has at least one synonymous term in said interstitial language specification and wherein said at least one term of said interstitial language specification corresponds to a term that has a bootstrap definition in a language specification of said first language.

11. The security-enhanced computing method of claim 1, comprising:

configuring one or more grammar rules of said language specification of said second language to adapt one or more grammar rules of said first language by transposing two arguments within an instruction thereof before a translation of said first device-executable instruction series that is valid in said first language into said translated second device-executable instruction series that is valid in said second language.

12. The security-enhanced computing method of claim 1, comprising:

configuring said language specification of said second language to replace more than half of said terms in said language specification of said first language before a translation of said first device-executable instruction series that is valid in said first language into said translated second device-executable instruction series that is valid in said second language.

13. The security-enhanced computing method of claim 1

(A) wherein said invoking said transistor-based circuitry configured to establish said protected computing environment configured to use said second-language parser to process both said translated second device-executable instruction series and said at least one of said corresponding translated second device-executable instruction series comprises establishing said protected computing environment as an environment in which a first compiler is configured to process said translated second device-executable instruction series and said at least one corresponding translated second device-executable instruction series that are valid in said second language, wherein said first compiler includes said second-language parser, whereby said protected computing environment can access at least some service of said one or more additional device-executable instruction series without any vulnerability to code in said first language being processed in said protected computing environment, and whereby said corresponding translated second device-executable instruction series comprises said other version of said at-risk software and (B) wherein said security-enhanced computing method further comprises:

said allowing said translated second device-executable instruction series that is valid in said second programming language but not in said first programming language to be executed in said protected computing environment by applying said language specification of said second programming language in lieu of said language specification of said first programming language; and said allowing at least some of said other version of said at-risk software that includes said corresponding translated second device-executable instruction series to execute in said protected computing environment by applying said language specification of said second programming language in lieu of said language specification of said first programming language.

14. A security-enhanced computing system configured to cause a migration of at-risk software that is valid according to a language specification of an open first programming language, comprising:

transistor-based circuitry configured to cause one or more translators to translate a first device-executable instruction series that is valid in said open first programming language indirectly into a translated second device-executable instruction series that is valid in a second programming language but not in said open first programming language, via at least one interstitial third language defined by an interstitial language specification, wherein said interstitial language specification defines at least one term that is undefined in a language specification of said second programming language;

transistor-based circuitry configured to cause said one or more translators also to translate numerous additional device-executable instruction series that are valid in said open first programming language but not in said second programming language each into a corresponding translated second device-executable instruction series that is valid in said second programming language but not in said open first programming language;

transistor-based circuitry configured to recognize whether content is valid in said second programming language by applying a language specification of said second programming language in lieu of said language specification of said open first programming language as a second-language parser; and transistor-based circuitry configured to establish a protected computing environment configured to use said second-language parser to process both said translated second device-executable instruction series and at least one of said corresponding translated second device-executable instruction series, wherein said interstitial language specification defines at least one term that is absent from said language specification of said second programming language and has at least one synonymous term in said interstitial language specification, whereby said protected computing environment can access at least some service of said numerous additional device-executable instruction series without any vulnerability to code in said open first programming language being processed in said protected computing environment, and whereby said corresponding translated second device-executable instruction series comprises an other version of said at-risk software, and (A) wherein said transistor-based circuitry configured to establish said protected computing environment configured to use said second-language parser to process both said translated second device-executable instruction series and said at least one of said corresponding translated second device-executable instruction series comprises transistor-based circuitry configured to establish said protected computing environment as an environment in which a first compiler is configured to process said translated second device-executable instruction series and said at least one corresponding translated second device-executable instruction series that are valid in said second language, wherein said first compiler includes said second-language parser, whereby said protected computing environment can access at least some service of said one or more additional device-executable instruction series without any vulnerability to code in said first language being processed in said protected computing environment, and whereby said corresponding translated second device-executable instruction series comprises said other version of said at-risk software or (B) wherein said security-enhanced computing system is configured to allow said translated second device-executable instruction series that is valid in said second programming language but not in said first programming language to be executed in said protected computing environment by applying said language specification of said second programming language in lieu of said language specification of said first programming language and is also configured to allow at least some of said other version of said at-risk software that includes said corresponding translated second device-executable instruction series to execute in said protected computing environment by applying said language specification of said second programming language in lieu of said language specification of said first programming language.

15. The security-enhanced computing system of claim 14 wherein said security-enhanced computing system is configured to allow said translated second device-executable instruction series that is valid in said second programming language but not in said first programming language to be executed in said protected computing environment by applying said language specification of said second programming language in lieu of said language specification of said first programming language and is also configured to allow at least some of said other version of said at-risk software that includes said corresponding translated second device-executable instruction series to execute in said protected computing environment by applying said language specification of said second programming language in lieu of said language specification of said first programming language, wherein said transistor-based circuitry configured to establish said protected computing environment configured to use said second-language parser to process both said translated second device-executable instruction series and said at least one of said corresponding translated second device-executable instruction series comprises:

transistor-based circuitry configured to establish said protected computing environment as an environment in which a first interpreter is configured to execute said translated second device-executable instruction series that is valid in said second language, wherein said first interpreter includes said second-language parser.

16. The security-enhanced computing system of claim 14 wherein said transistor-based circuitry configured to establish said protected computing environment configured to use said second-language parser to process both said translated second device-executable instruction series and said at least one of said corresponding translated second device-executable instruction series comprises:

transistor-based circuitry configured to establish said protected computing environment as an environment in which said first compiler is configured to process said translated second device-executable instruction series and said at least one corresponding translated second device-executable instruction series that are valid in said second language, wherein said first compiler includes said second-language parser, whereby said protected computing environment can access at least some service of said one or more additional device-executable instruction series without any vulnerability to code in said first language being processed in said protected computing environment, and whereby said corresponding translated second device-executable instruction series comprises said other version of said at-risk software.

17. The security-enhanced computing system of claim 14 wherein said security-enhanced computing system is configured to allow said translated second device-executable instruction series that is valid in said second programming language but not in said first programming language to be executed in said protected computing environment by applying said language specification of said second programming language in lieu of said language specification of said first programming language and is also configured to allow at least some of said other version of said at-risk software that includes said corresponding translated second device-executable instruction series to execute in said protected computing environment by applying said language specification of said second programming language in lieu of said language specification of said first programming language.

18. A security-enhanced computing system configured to cause a migration of at-risk software that is valid according to a language specification of an open first programming language, comprising:
　　means for causing one or more translators to translate a first device-executable instruction series that is valid in said open first programming language indirectly into a translated second device-executable instruction series that is valid in a second programming language but not in said open first programming language, via at least one interstitial third language defined by an interstitial language specification, wherein said interstitial language specification defines at least one term that is undefined in a language specification of said second programming language;
　　means for causing said one or more translators also to translate numerous additional device-executable instruction series that are valid in said open first programming language but not in said second programming language each into a corresponding translated second device-executable instruction series that is valid in said second programming language but not in said open first programming language;
　　means for recognizing whether content is valid in said second programming language by applying a language specification of said second programming language in lieu of said language specification of said open first programming language as a second-language parser; and
　　means for establishing a protected computing environment configured to use said second-language parser to process both said translated second device-executable instruction series and at least one of said corresponding translated second device-executable instruction series, wherein said interstitial language specification defines at least one term that is absent from said language specification of said second programming language and has at least one synonymous term in said interstitial language specification, whereby said protected computing environment can access at least some service of said numerous additional device-executable instruction series without any vulnerability to code in said open first programming language being processed in said protected computing environment, and whereby said corresponding translated second device-executable instruction series comprises an other version of said at-risk software, and
　　(A) wherein said means for establishing said protected computing environment configured to use said second-language parser to process both said translated second device-executable instruction series and said at least one of said corresponding translated second device-executable instruction series comprises means for establishing said protected computing environment as an environment in which a first compiler is configured to process said translated second device-executable instruction series and said at least one corresponding translated second device-executable instruction series that are valid in said second language, wherein said first compiler includes said second-language parser, whereby said protected computing environment can access at least some service of said one or more additional device-executable instruction series without any vulnerability to code in said first language being processed in said protected computing environment, and whereby said corresponding translated second device-executable instruction series comprises said other version of said at-risk software or
　　(B) wherein said security-enhanced computing system is configured to allow said translated second device-executable instruction series that is valid in said second programming language but not in said first programming language to be executed in said protected computing environment by applying said language specification of said second programming language in lieu of said language specification of said first programming language and is also configured to allow at least some of said other version of said at-risk software that includes said corresponding translated second device-executable instruction series to execute in said protected computing environment by applying said language specification of said second programming language in lieu of said language specification of said first programming language.

19. The security-enhanced computing system of claim 18 wherein said means for establishing said protected computing environment configured to use said second-language parser to process both said translated second device-executable instruction series and said at least one of said corresponding translated second device-executable instruction series comprises:
　　means for establishing said protected computing environment as an environment in which said first compiler is configured to process said translated second device-executable instruction series and said at least one corresponding translated second device-executable instruction series that are valid in said second language, wherein said first compiler includes said second-language parser, whereby said protected computing environment can access at least some service of said one or more additional device-executable instruction series without any vulnerability to code in said first language being processed in said protected computing environment, and whereby said corresponding translated second device-executable instruction series comprises said other version of said at-risk software.

20. The security-enhanced computing system of claim 18 wherein said security-enhanced computing system is configured to allow said translated second device-executable instruction series that is valid in said second programming language but not in said first programming language to be executed in said protected computing environment by applying said language specification of said second programming language in lieu of said language specification of said first programming language and is also configured to allow at least some of said other version of said at-risk software that includes said corresponding translated second device-executable instruction series to execute in said protected computing environment by applying said language specification of said second programming language in lieu of said language specification of said first programming language.

* * * * *